Dec. 23, 1969  D. E. LIPFERT  3,485,126
TAPE DISPENSING APPARATUS
Filed April 27, 1966  12 Sheets-Sheet 1

INVENTOR.
DONALD E. LIPFERT
BY
Kenway, Jenney & Hildreth
ATTORNEYS

Dec. 23, 1969     D. E. LIPFERT     3,485,126
TAPE DISPENSING APPARATUS

Filed April 27, 1966     12 Sheets-Sheet 2

FIG. 2

INVENTOR.
DONALD E. LIPFERT
BY
Kenway, Jenney + Hildreth
ATTORNEYS

Dec. 23, 1969  D. E. LIPFERT  3,485,126
TAPE DISPENSING APPARATUS
Filed April 27, 1966  12 Sheets-Sheet 3

INVENTOR.
DONALD F. LIPFERT
BY
Kenway, Jenney & Hildreth
ATTORNEYS

Dec. 23, 1969      D. E. LIPFERT      3,485,126
TAPE DISPENSING APPARATUS
Filed April 27, 1966      12 Sheets-Sheet 4
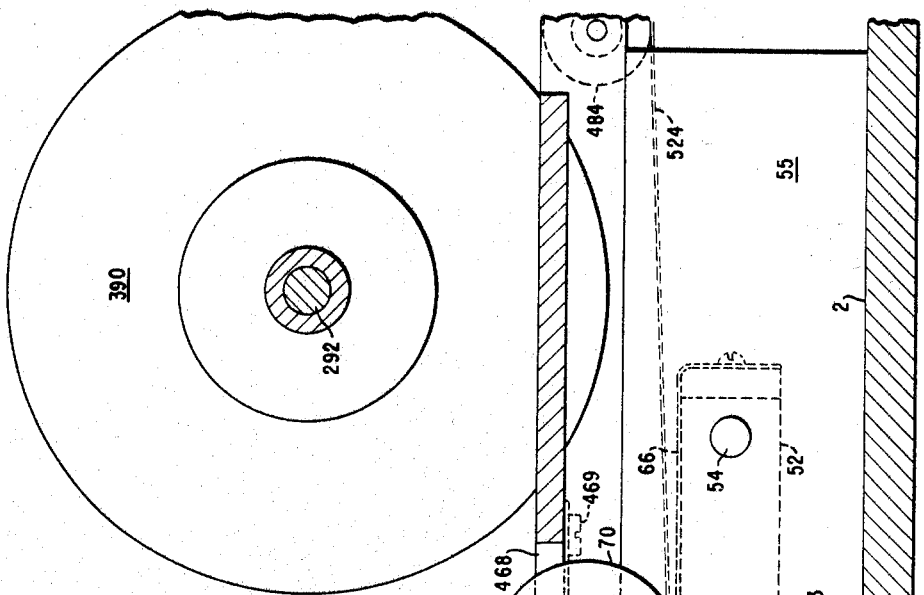
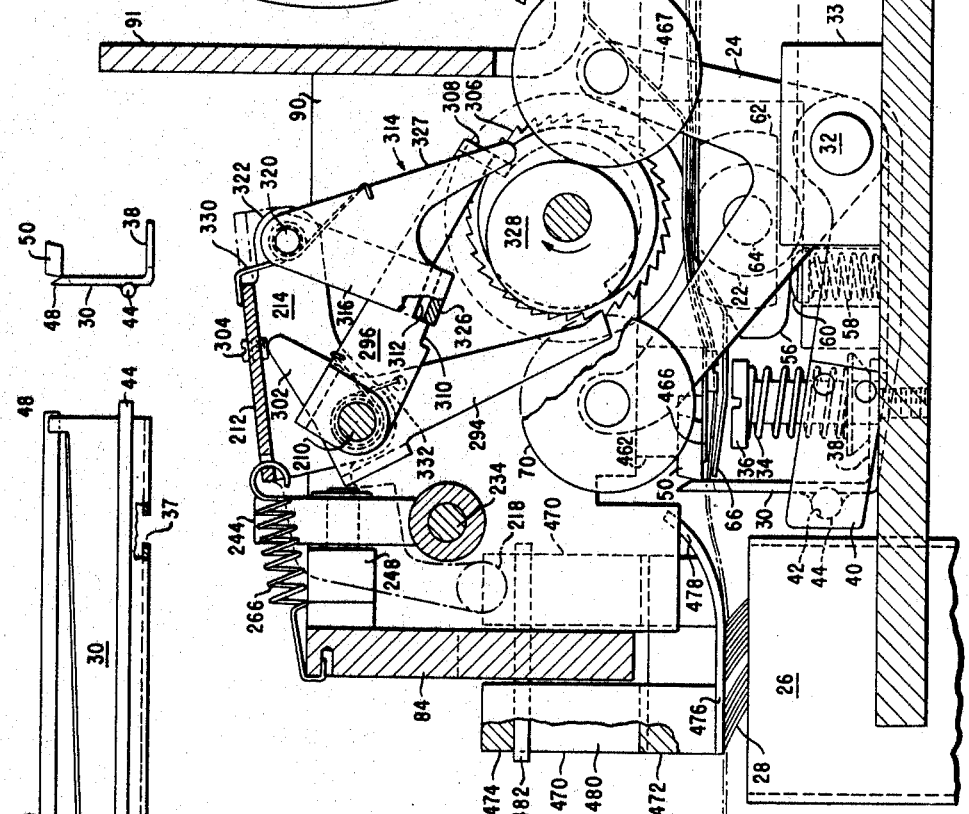
INVENTOR.
DONALD E. LIPFERT
BY
Kenway, Jenney & Hildreth
ATTORNEYS

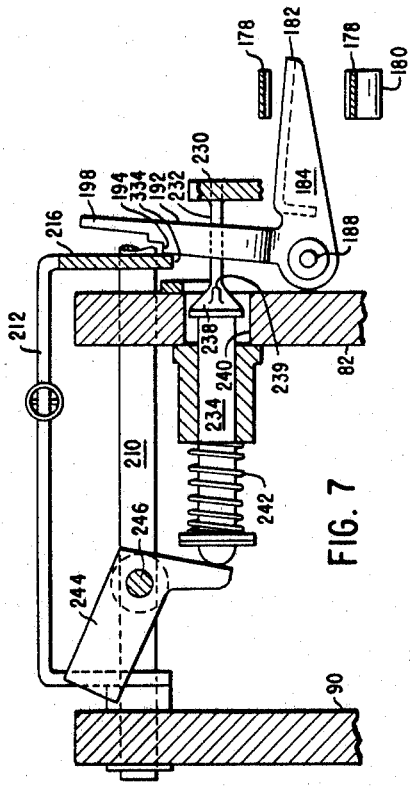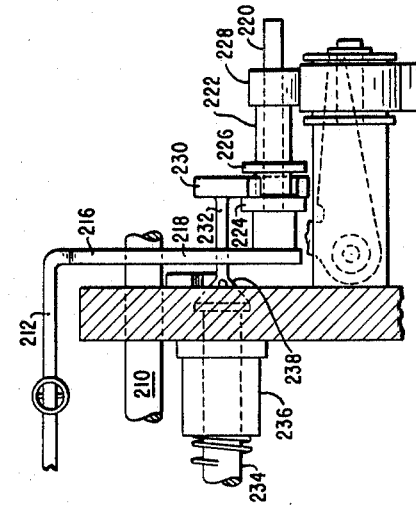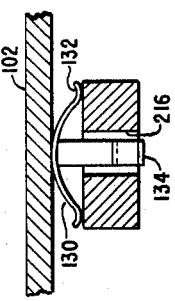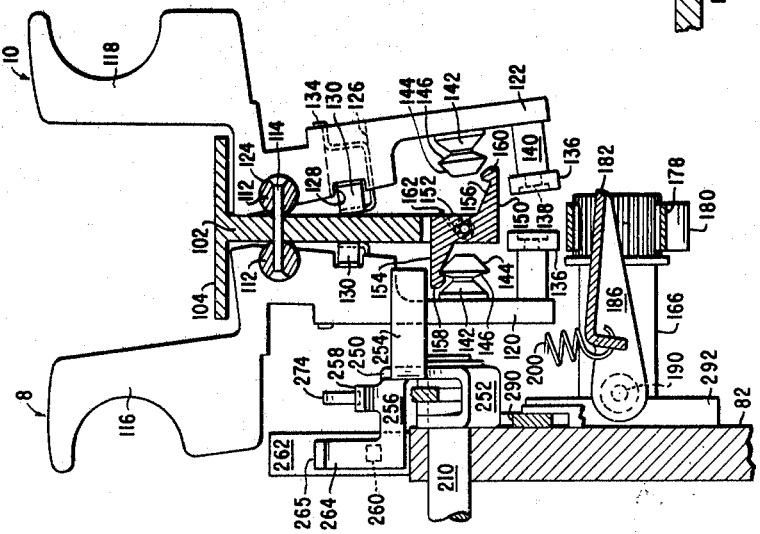

Dec. 23, 1969  D. E. LIPFERT  3,485,126

TAPE DISPENSING APPARATUS

Filed April 27, 1966  12 Sheets-Sheet 6

FIG. 10

INVENTOR.
DONALD E. LIPFERT
BY
Kenway, Jenney & Hildreth

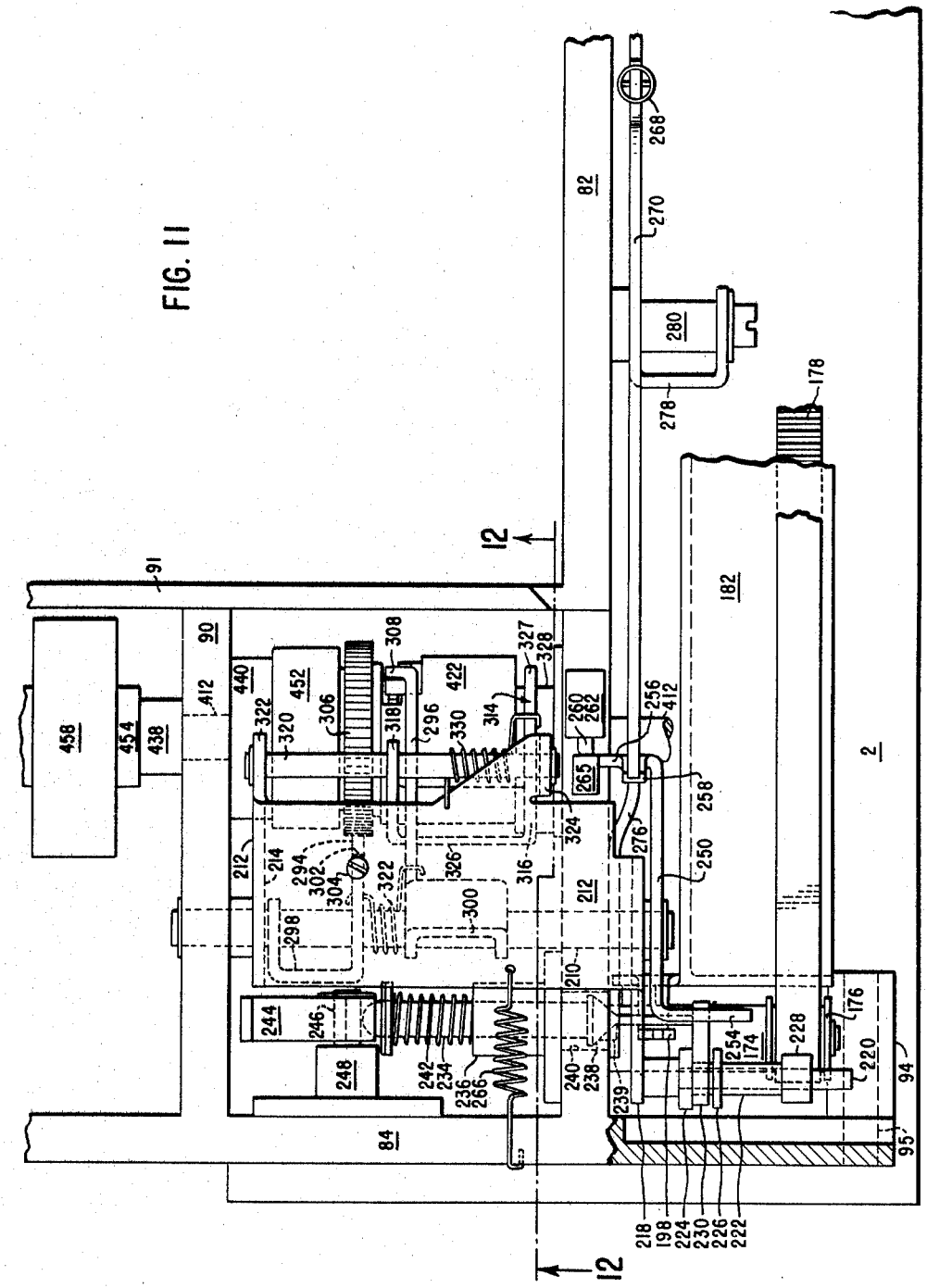

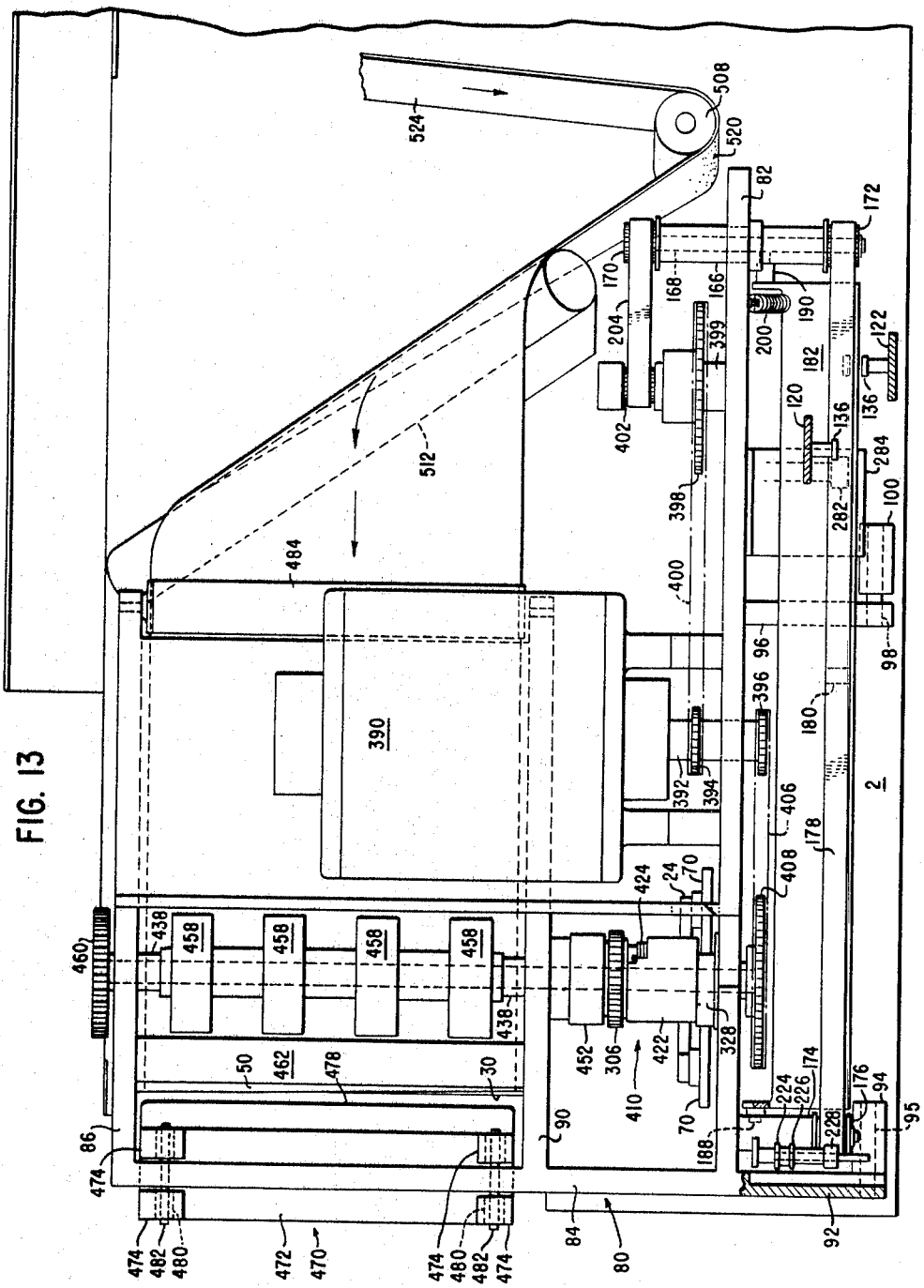

Dec. 23, 1969　　　D. E. LIPFERT　　　3,485,126
TAPE DISPENSING APPARATUS
Filed April 27, 1966　　　　　　　　　　　　　12 Sheets-Sheet 9
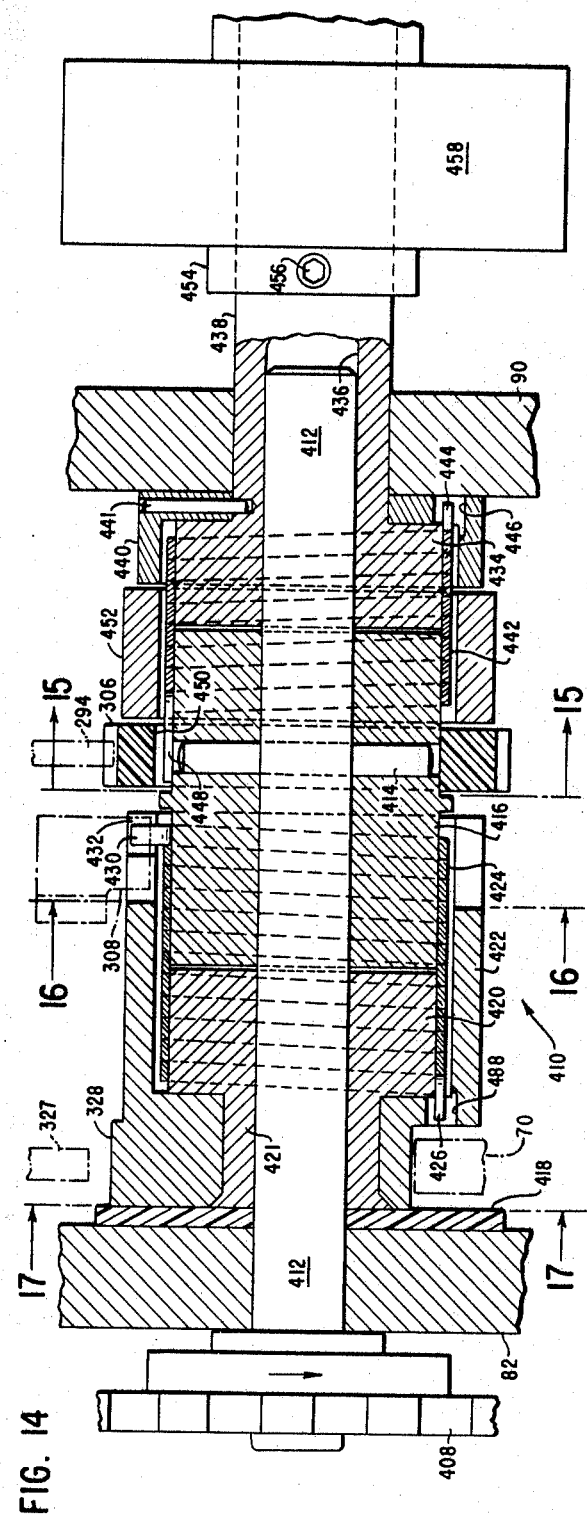
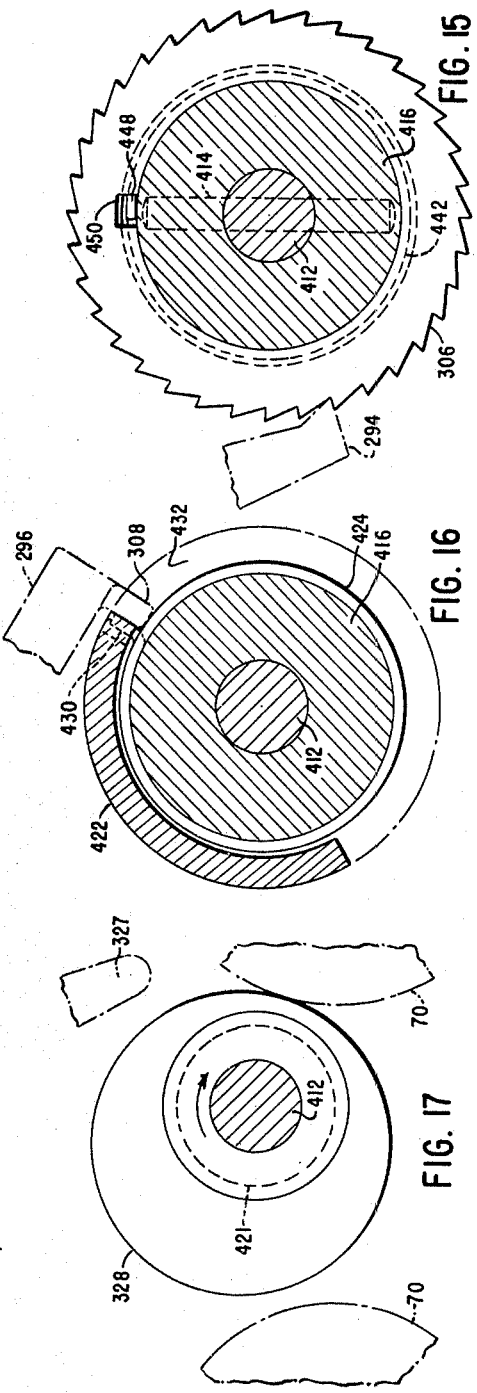
INVENTOR.
DONALD E. LIPFERT
BY Kenway, Jenney + Hildreth
ATTORNEYS Dec. 23, 1969      D. E. LIPFERT      3,485,126
TAPE DISPENSING APPARATUS
Filed April 27, 1966      12 Sheets-Sheet 10
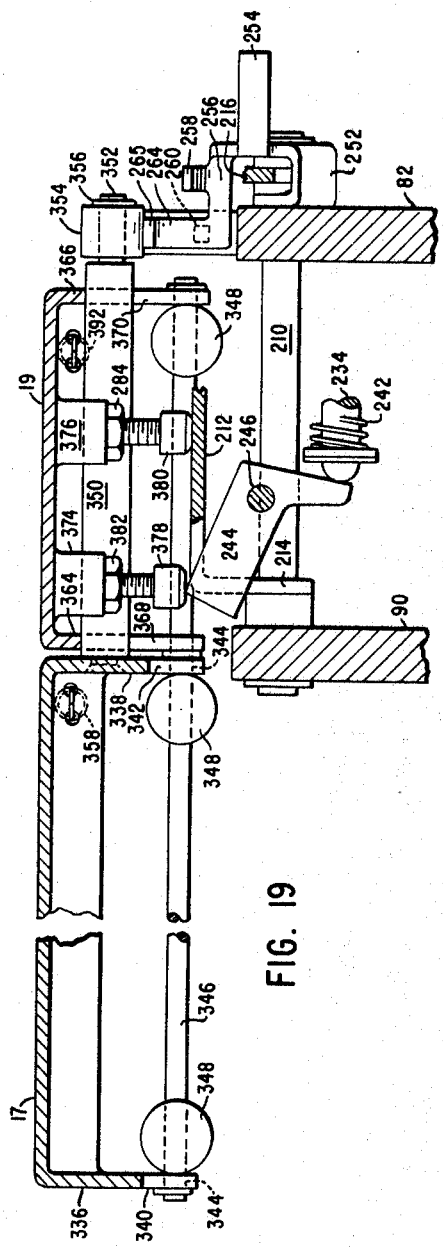
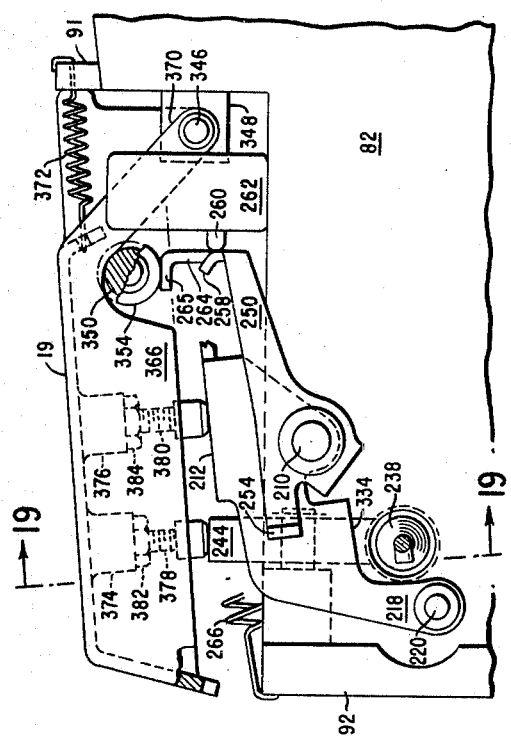
INVENTOR.
DONALD E. LIPFERT
BY
Kenway, Jenney & Hildreth
ATTORNEYS INVENTOR.
DONALD E. LIPFERT
BY
Kenway, Jenney & Hildreth
ATTORNEYS INVENTOR.
DONALD E. LIPFERT
BY
Kenway, Jenney & Hildreth
ATTORNEYS

United States Patent Office 3,485,126
Patented Dec. 23, 1969

3,485,126
TAPE DISPENSING APPARATUS
Donald E. Lipfert, Woolwich, Maine, assignor to Nashua Corporation, Nashua, N.H., a corporation of Delaware
Filed Apr. 27, 1966, Ser. No. 545,761
Int. Cl. B26d 5/20
U.S. Cl. 83—205                                27 Claims

ABSTRACT OF THE DISCLOSURE

The invention is an automatic tape dispensing apparatus which provides means for presetting the apparatus to dispense one or more predetermined lengths of gummed tape at the will of the operator, the operator actuating one of a plurality of length setting means to get the length desired. Provision is made on the machine for also dispensing lengths of tape of indeterminate length, that length to be determined by the operator at his will.

---

This invention relates to tape dispensers, and particularly to the semi-automatic type which provides means for presetting the apparatus to dispense a plurality of predetermined lengths of gummed tape, the machine then dispensing tape in a length determined by which of the presetting means is actuated by the operator.

In the use of gummed-tape dispensing machines, particularly in large shipping departments where goods are often packed in cardboard cartons, one of the problems encountered is that in a rectangularly-shaped carton, the edges of the flaps to be sealed are of different length. This, then, requires different lengths of gummed tape for the sealing. In the hand operated type of tape-dispensing apparatus, it is left to the shipping personnel to determine (for example, by varying the throw of a hand-operated lever) the length of the tape the machine will issue, and even though such personnel become very adept at moving the lever the proper distance, nevertheless there will be times when the tape dispensed is either too short or too long. In both of these cases there probably will result a wastage of either time or tape. Since cardboard cartons come in standard sizes, it would therefore be highly advantageous, knowing the length of the edges of a carton, to be able to have the tape dispensing machine automatically issue the lengths which will give the right sealing and yet not waste tape, the machine incorporating one or more presettable length selectors for that purpose.

In a shipping department, while it is customary to use a standard size carton for a given kind of goods being packed, nevertheless need will arise for a larger carton, or for a different length of tape, and therefore means should be provided on the tape dispensing apparatus for dispensing an indeterminate length of tape, in this case the operator determining by manual actuation of the machine, the length of tape desired. Even more advantageously, the operation of the machine for such an indeterminate length should not change the position of the selector units already established for most cartons.

It is therefore the general purpose of this invention to provide a machine which answers the above problems and others, and among the several provisions and objects of the invention may therefore be noted the following:

The provision of a tape-dispensing machine which dispenses automatically upon, actuation thereof, a predetermined length of tape; the provision of a machine of the above class which automatically moistens the gum on the tape and at the end of the dispensing of the predetermined length, automatically severs that length from the supply of tape; the provision of a machine of the above classes in which an indeterminate length of tape may be obtained by manual actuation of the machine; the provision of a semi-automatic tape-dispensing machine in which there are a plurality of selectors which can be preset to obtain more than one predetermined length of tape; the provision of a machine of the last named class, in which when one of the plurality of selectors is set, it automatically releases the others of said plurality so that only one length of tape is dispensed; the provisions of a machine for tape dispensing using preselectors for lengths of tape, in which the preselector mechanism may be overridden by a manually actuable control in order to dispense an indeterminate length of tape, without the necessity of changing or again pre-positioning the selector mechanisms; the provision of a machine of any of the above classes which is motor operated, the motor energizing the operating parts of the machine through a pair of clutches, these clutches operating from or on a common input drive shaft, respective operations of feeding of tape and cutting of the tape from a source thereof being operated by output drums mounted on the common input shaft; the provision of a machine of any of the above classes in which the machine is so controlled that upon actuation, the machine automatically first dispenses a predetermined length of tape, and then automatically severs the tape from the source thereof; the provision of a tape-dispensing machine of the last named class in which the machine, after a cutting operation, is automatically conditioned to be ready for the dispensing of a length of tape of the first length dispensed or of another predetermined length without the necessity of resetting the selector mechanisms to an initial position; the provision of a machine of any of the above classes in which the number of preselector controls can readily be changed; the provision of a machine of the above classes in which a feed operation and a cut-off operation are sequenced automatically; the provision of a machine of any of the above classes, in which the means for selecting the several lengths of tape to be dispensed is simple; the provision of a machine of any of the above classes in which the indicating means for given tape lengths is readily and conveniently readable; the provision of a machine of the above classes which is simple to use, economical as to the tape to be dispensed, and relatively economical to manufacture and maintain. Other provisions and advantages will be in part obvious and in part pointed out hereinafter.

The invention accordingly comprises the elements and combinations of elements, features of construction, and arrangements of parts which will be exemplified in the structures hereinafter described, and the scope of the application of which will be indicated in the appended claims.

In the drawings in which there is shown one embodiment of this invention:

FIG. 2 is a side elevation of a portion of the apparatus, with the cover thereof removed;

FIG. 4 is a front elevation of a knife structure used in the apparatus for severing tape as it emerges therefrom;

FIG. 5 is an end view of the knife structure of FIG. 4;

FIG. 6 is an end view, partly in section, of the latching mechanism of the apparatus taken in the direction of sight lines 6—6 on FIG. 2, other parts of the machine being omitted for purposes of clarity;

FIG. 7 is a view, in section, of a portion of the apparatus, taken in the direction of sight lines 7—7 on FIG. 10;

FIG. 8 is an enlarged view, taken in the direction of sight lines 8—8 on FIG. 10, showing further details of the trip mechanism;

FIG. 9 is an enlarged view of a biasing spring structure used in the FIG. 6 drawing;

FIG. 10 is an enlarged view of a portion of FIG. 2 to show in greater detail certain constructional details of the apparatus;

FIG. 11 is a plan view of a portion of the apparatus;

FIG. 12 is a view, partly in section and taken in the direction of sight lines 12—12 on FIG. 11, of a portion of the apparatus, in order to show construction details and relationships of the clutch drive and control pawls therefor;

FIG. 13 is a view, of a portion of the machine similar to FIG. 11, but with certain parts removed in order to show other constructional details more clearly;

FIG. 14 is a sectional view of a drive clutch construction utilized in the apparatus;

FIG. 15 is a view of the FIG. 14 clutch, taken in the direction of sight lines 15—15 thereon;

FIG. 16 is a view of the FIG. 14 clutch, taken in the direction of sight lines 16—16 thereon;

FIG. 17 is a view of the FIG. 14 clutch, taken in the direction of sight lines 17—17 thereon;

FIG. 18 is a side view of a portion of the apparatus, given to illustrate constructional features of an arrangement for getting a repeat length of tape, or a random length;

FIG. 19 is a front view of the elements of FIG. 18, taken in the direction of sight lines 19—19 thereon;

Figure 1:
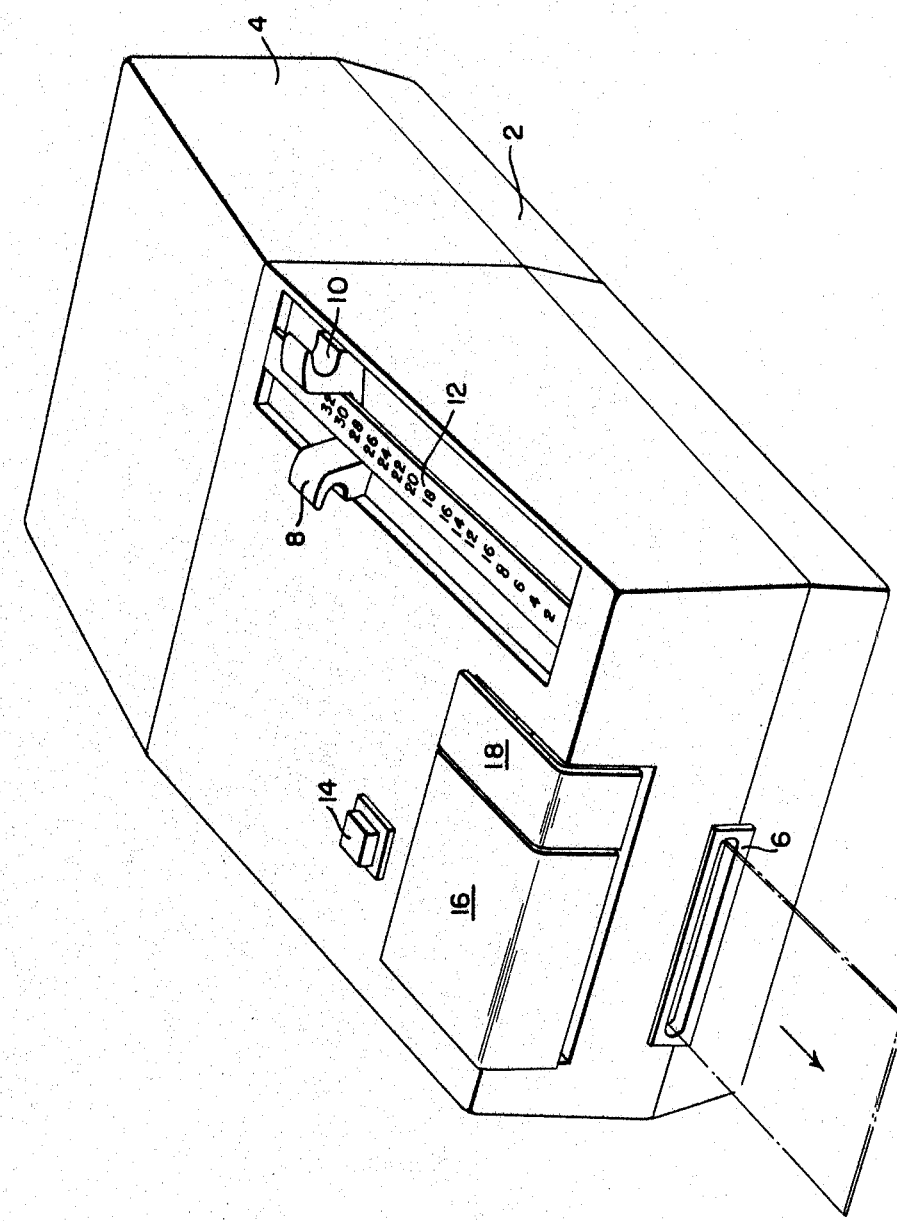
FIG. 1 is a perspective view of the apparatus of this invention, illustrating its overall external appearance.

Throughout the drawings, similar characters indicate corresponding parts. Dimensions of certain of the parts as shown in the drawings may have been modified and/or exaggerated for the purposes of clarity of illustration. It is also to be noted that in the drawings, certain parts have been omitted from a given drawing in order to render the drawings clearer and less confusing, these omitted parts being shown in other drawings.

In setting forth the description of the embodiment of the invention as an example thereof, the subject matter will be organized under the following sections:

I. Movable Knife, Tape Feed Roller, Cam Follower, and Movable Platform Assembly
II. Tap-length Setting and Apparatus Trip Mechanism
III. Detent and Pawl Plate Mechanism
IV. Spring Clutch Drive Mechanism for Tape Feeding and Cut Off
V. Tape Roll Holder and Guide
VI. Operation

I. MOVABLE KNIFE, TAPE FEED ROLLER, CAM FOLLOWER, AND MOVABLE PLATFORM ASSEMBLY

Referring to the drawings, and, at the outset, particularly to FIG. 1, there is shown a semi-automatic tape dispenser comprising a base indicated generally by numeral 2, a cover 4 therefor, an exit slot 6 for tape dispensed, a pair of preselector push buttons 8 and 10, a length indicator bar 12, a starting switch 14 for the general control of the machine, a manually-depressible plate, generally indicated by numeral 16, for obtaining repeat lengths of tape as determined by one of the selector push buttons, and a manually-depressible plate, generally indicated by numeral 18, for actuating the machine to provide a continuous run of tape. The machine as a whole may rest directly on the base 2, but preferably rest upon four legs (not shown because they are conventional) which are attached to the under side of the base.

FIG. 2 shows a side view of a portion of the machine with the cover removed. The apparatus is compactly assembled, and in order to clarify the drawings, it is to be noted that in this and other views, certain parts have been omitted in order to obtain a greater understanding of the construction of the machine and its method of operation. However, the omitted parts are more fully illustrated in other views, both as to their construction and their position and operational relations to the apparatus. As an example of this, in FIG. 2, there have been omitted the manually actuable plates 16 and 18 and the general purpose switch 14. Also, the motor which energizes the machine as a whole has been omitted, the means for holding a roll of tape, and a pawl-controlling plate 212. As stated above, it will be obvious from the other drawings, how these parts are placed on the machine and their function.

Referring to FIGS. 3, 12, 13 and 21, on the base 2 there is mounted a roll of tape 20, the roll being rotatably mounted on base 2, a rotating rubber roller 22, an oscillatable V-shaped cam follower 24, a water-containing compartment or box 26, a brush 28 mounted in conventional manner in the water box 26, a vertically movable cut-off knife blade 30, this knife blade being moved vertically of the base by a shaft 32 rotatably journaled on the base by suitable bearings 33 and in turn actuated by the V-shaped cam follower 24. A spring 34 surrounds a stud 36 which is screwed into the base, the stud passing through a slot 37 in an inwardly-turned flange 38 which is integral with blade 30, the bottom end of the spring resting against this flange as shown. A lever 40 has one end fastened to the shaft 32, and has its other end pivotally attached to the end of the knife blade 30. A similar lever 41 (see FIG. 3) is affixed by one end to shaft 32 at the other end thereof, the other end of this lever being pivotally fastened to the other end of the knife blade. (For such pivotal attachment, suitable holes 42 are provided in the ends of the levers, which receive the pivot extensions 44 one at each end of the knife blade.) When the cam follower 24 rotates shaft 32, the ends of levers 40 and 41 move the knife blade 30 vertically.

The knife blade 30 is provided with the cutting edge 46 (see FIGS. 4 and 5), and at one end of the knife blade there is provided an extension 48 for the purpose of guiding the knife blade in its upward cutting off motion, this extension being in line with the knife blade, and bearing against an unused end portion of a knife blade 50, blade 50 being mounted in a sub-base or support 80 (described below) for easy access and cooperating with movable blade 30 for severing tape.

A platform 52 is pivoted to swing on the base 2 by means of the pivots or a shaft 54, the ends of which are journaled in a pair of upstanding support plates 55 fastened to the base 2, the forward end of the platform resting on the upper ends of a spring suspension comprising a compression spring 58 one end of which rests on the base 2 in a suitably provided support therefor, and the other end (or top) of which mounts a button 60 which in turn supports the aforesaid forward end 56. The platform 52 mounts the bearing blocks 62, these bearings supporting the ends of the shaft 64 on which is mounted the rubber roll 22, one of the bearing blocks 62 being provided at each side of the platform 52.

Also mounted on the platform 52 is a tape guide member 66 of flexible sheet metal, this member overlying the roll 22, and the latter projecting therethrough (see FIG. 3) by means of a suitably provided slot in the member 66. The tape guide member continues forwardly, as shown in FIG. 12, to approximately the knife blade 30. The functions of member 66 are to provide a smooth bearing surface over which tape can slide as it is being ejected from the machine, and to act as a guide for the tape over the upper edge of blade 30. For this reason, the forward end of cap 66, when the knife blade is in its downward position, is just slightly above the level of the knife edge.

At the other end of shaft 64 there is mounted a pinion 68 (see FIG. 3) by means of which, and as described later, the roll 22 is turned to assist in feeding tape forward and out of the machine.

Figure 3:
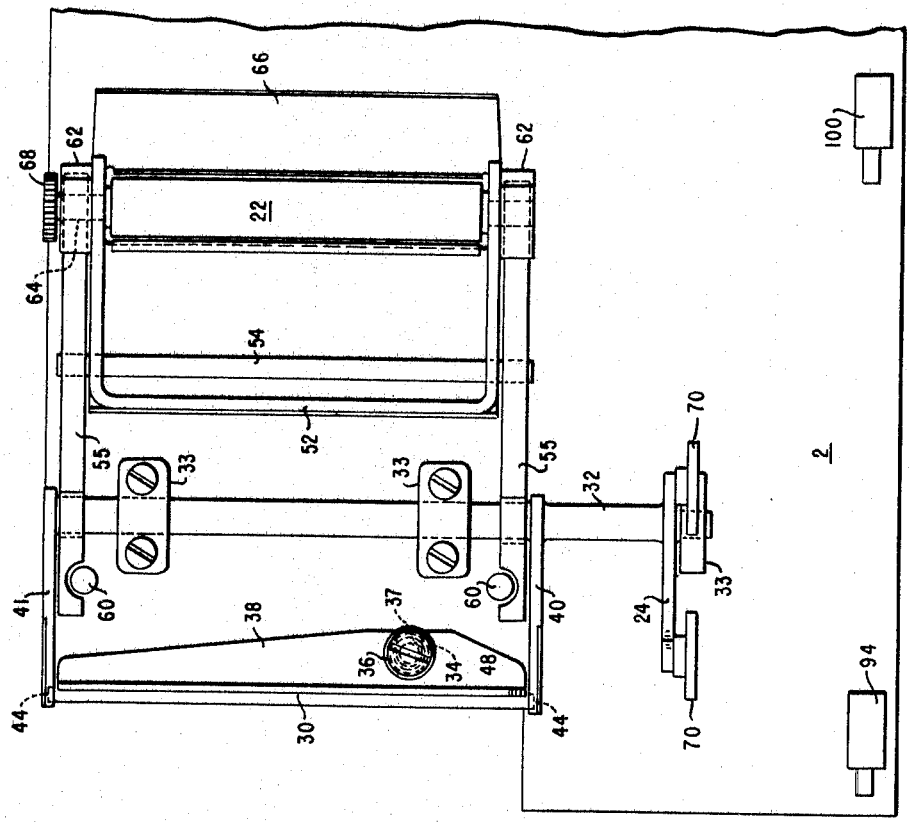
FIG. 3 is a plan view of a portion of the apparatus, with certain parts tilted back in order to illustrate constructional details of other portions otherwise hidden.

For purposes of clarity, certain conventional details have been omitted from the drawing and from this description. For example, the method of attaching the water box 26 to the base is conventional, and should be such as to permit the water box to be readily removed for filling and cleaning. The method of attaching the brush 28 to the inside of the water box is also conventional. The attachment of the bearing blocks 62 to the sides of the platform 52 is also conventional, as is also the method of fastening the rubber roller to the shaft 64. The method of swinging the platform 52 on the base by means of shaft 54 is also conventional, the only thing to be noted being that the attachment of the shaft 54 to the base should be high enough to allow the platform to be lifted upwardly to clean the roller 22, if desired, as shown in FIG. 3.

Rotatably mounted by conventional means at the ends of the arms of the V-shaped yoke 24 are the rollers 70, these rollers, as will be explained later, engaging a cam at the end of one of the drums on the drive shaft, the rollers serving as cam followers.

II. TAPE-LENGTH SETTING AND APPARATUS TRIP MECHANISM

An upper support frame or sub-base 80 is provided (see FIG. 13) comprising a framework made of plate sides 82, 84, and 86, and having a plate support member 90, the latter being attached by one end to the side 84 and extending rearwardly parallel to the side 82. At its other end, support member 90 is attached to a back member 91, which extends between members 82 and 86. Preferably the entire frame work 80 should be made of cast iron, cast as an integral piece, or may be made of cast aluminum. Side 84 is provided with an extension 92 extending beyond the place of side 82. Extension 92 is pivoted (as shown in FIG. 10) to a supporting bracket 94 which is mounted on the base 2. Intermediate the ends of the side 82 is provided a laterally and downwardly extending extension plate 96 (see FIGS. 2 and 13). Extension plate 96 is pivoted by means of pivot 98 to a supporting bracket or mount 100 which is mounted on the base 2. By means of the supports 94 and 100 and the pivots 95 and 98, the entire upper support frame 80 is pivoted on the base 2, so that it and the operating parts that it supports may be lifted away from the base-mounted assembly of the lower roller 22, the cam follower yoke 24, the knife blade 30, and other base-supported elements. In this way, ready access is provided, for cleaning and maintenance, of these said base-mounted operating parts and also for operating elements carried by the frame 80.

Attached to the side 82 is a composite length selector and apparatus actuating structure which will now be described a plate 102 (see FIGS. 2 and 6) is provided having a laterally extending top 104 to form a T-bar. Plate 102 and its top 104 can be cast integrally, if desired, or the top 104 may be attached separately to the plate 102. Plate 102 is attached to the frame side 82 by screws 106, and is spaced therefrom by suitable bushings or brackets 108 and 110 at the ends thereof.

Attached along each side of the bar 102 (see FIG. 6) are the guide and holding rods 112. These rods may be attached to the bar 102 by providing suitable holes and rivets 114.

The rods 112 serve as guides and mounting hinges for the preselector controls or push buttons 8 and 10 as follows: Each of the buttons 8 and 10 is made of a strong, durable, molded plastic such as nylon, and comprises the head portions 116 and 118 and the tail portions 120 and 122, respectively. (Since the buttons 8 and 10 are identical, description of these buttons will now be confined to button 10.) A circular bore 124 is provided, during the molding operation, near the upper end of the tail 122 and of such size as to be a smooth sliding fit on the guide rod 112. The center of the bore 124 is displaced slightly laterally, as shown, so that the bore intersects the inner face of the tail 122 and thus provides a closer fit of the tail 122 adjacent the plate 102. A slot 126 is provided extending from the inside surface of the tail 122 to the outside surface, this slot intersecting a cross slot 128 which is provided on the inside surface of tail 122. A spring 130 (see FIG. 9) is provided, generally in the shape of a T, the ends 132 or the cross bar of the spring riding in the slot 128, and the spring being held in the slot 126 by means of the upturned end 134 of the stem. The crossbar of spring 130 bears against the side of the plate 102 and serves to bias the push button 10 counterclockwise about the guide rod 112 (as viewed in FIG. 6). That is, it tends to bias the lower end of the tail portion 122 away from the plate 102. (It is to be noted, that since preselector button 8 is on the other side of the T-plate 122, the similar spring 130 tends to bias this selector button clockwise about the guide rod 124 in order to bias the extremity 120 away from the T-plate.)

Adjacent the end of tail portion 122 there is provided a roller 136 rotatably mounted on the pin 138 which is riveted to the tail 122, a spacer bushing 140 being provided to space the roller 136 away from tail 122. Intermediate the roller 136 and the slot 126 there is provided a detent or latch 142 in the form of a double cone this being secured to the tail 122 by conventional means such as riveting. The double cone provides the two inclined cam surfaces 144 and 146.

At each end of the plate 102 there is provided a dependent leg 148 (see FIG. 2), and supported between these legs and running lengthwise of the plate 102 is the Z-shaped bar 150. The Z-bar is rotatably supported on pins at its ends which engage legs 148 by conventional means, so that the Z-bar is rotatable on an axis lying in the plane of the plate 102.

Z-bar 150 is provided with a center web 152 and the laterally extending arms 154 and 156, each of which is provided with a hook 158 and 160, respectively, hook 158 pointing downwardly (as drawn in FIG. 6) and hook 160 pointing upwardly. These hooks are positioned so as to be engaged by the cone detents or latches 142.

The operation of this latching engagement is as follows:

Starting with the position of the push button preselectors as shown in FIG. 6, if the preselector push button 10 is pushed downwardly, it will cause the push button as a whole to rotate clockwise about the guide rod 112. As it does so, the tail 122 moves to the left (as drawn) thus bringing the inclined surface 144 into engagement with the hook 160. Continued motion of the push button 10 downwardly will cause the hook 160 to cam downwardly against the inclined surface 144, thus rotating the Z-bar 150 clockwise about its axis. The result of this is to lift hook 158 upwardly to free the engagement of the cone 142 from hook 158, thus allowing push button preselector 8 to move (under the bias of its spring 130) clockwise about the rod 112, and thus move its roller 130 away from its former position under the plate 102. While this is happening, the cone 142 on tail 122 has moved over above the hook 160, and under the influence of a biasing spring 162 which is provided to bias the Z-bar counterclockwise about its pivots, the hook 160 moves upwardly to engage the detent cone 142. This brings the roller 136 at the end of tail 122 under the plate 102.

If, now, push button 8 is pushed downwardly, as the cone 142 on tail 120 now moves to the right, its inclined surface 144 engages the hook 158, the effect of this being to rotate the Z-bar clockwise about its pivots until the cone on extension 120 moves in underneath the hook 158. At this point, it becomes latched therein, thus returning roller 136 at the end of tail 120 to its illustrated position under plate 102. At the same time, that this is happening, the extension 160 has been moved downwardly, and this frees the cone 142 on extension 122 in order to permit push button 10 to swing counterclockwise to disengage the detent cone 142 from hook 160.

It will be noticed that by the double action of the Z-bar and the cones 142, it is possible for only one of the preselector push buttons to be engaged by the Z-bar at any one time, regardless of how many push buttons are assembled on the plate 102. If there are a plurality of push buttons, and any one of these push buttons is pushed downwardly, the result of this is to free the other push buttons and let them rotate about their respective guide rods 112 away from the plate 102.

Mounted at one end of the side 82 and perpendicular thereto is a bearing 166 (see FIG. 13). Bearing 166 extends through side 82. A shaft 168 is journaled in bearing 166 and has at each end thereof the sprocket wheels 170 and 172. At the other end of side 82 is mounted a bearing 174 carrying a shaft on which is mounted the sprocket wheel 176. A toothed-belt 178 is trained on the sprocket wheels 176 and 172 for positive engagement therewith. Extending laterally across the belt and fastened thereto at one position is a projection or knob 180, (see, for example, FIGS. 2, 6 and 10).

The timing belt 178 is positioned to lie in substantially the same plane as, but below, the plate 102. It also lies below the rollers 136, when the latter are in the latched in position (as shown in FIG. 6), but is separated therefrom by a distance less than the amount the knob 180 projects above the surface of the belt 178.

An elongated laterally extending trip-plate 182 is pivotally mounted on side 82 below the rollers 136 by means of a pair of brackets 184 and 186 at each end of the trip plate. These brackets have their inner ends pivotally mounted with respect to the frame 82 by means of pivots 188 and 190, respectively, (see FIGS. 6 and 7) which are suitably attached to the bearing 166 (as to pivot 190) and bearing 174 (as to pivot 188). Plate 182 projects into the loop of the belt 178, and in its normal position the upper section of the belt lies closely adjacent to the top of the plate 182, so that if this upper section of the belt is depressed at any time as it traverses the plate, it will, in turn, cause the plate to swing downwardly, that is, clockwise (as drawn) about its pivots 188 and 190.

Bracket 184 extends upwardly to form a finger 192 having the notch 194 therein. A spring 200 biases the trip plate upwardly, one end of the spring being attached to the trip plate, and the other end being secured to side 82.

With the parts thus described, and referring particularly to FIGS. 6 and 7, if the push button 8 is positioned as shown, then as the belt traverses the trip plate 182, eventually the knob 180 will become interposed between the roller 136 at the end of button 8 and the trip plate. When this happens, the trip plate will be forced downwardly by knob 180. A similar action takes place in respect to push button 10, if it is latched in to bring its roller 136 over the belt 178, instead of push button 8. When the roller 136 of push button 10 is engaged by the knob 180, again, the trip plate 182 will be depressed.

Thus it will be seen that, depending on where the preselector push buttons are located along the T-bar 102, any one of the push buttons will determine, by its position along the T-bar, just when the trip plate is to be pushed downwardly to move the finger 192.

III. DETENT AND PAWL PLATE MECHANISM

Pivoted on shaft 210, the ends of which are suitably journaled in the frame side 82 and the support plate 90 (see FIGS. 10 and 12) is a pawl-controlling plate 212, pivoting being done by providing down turned flanges 214 and 216 on plate 212, and by providing suitable bearing holes in the frame plates 82 and 90 to receive the shaft. Flange 216 is further extended downwardly and to the left (as drawn in FIG. 10) to provide a finger 218 in the same plane as flange 216. A shaft 220 has one end attached to the end of finger 218 and journals thereon the rotatable sleeve 222, (see FIG. 8). Sleeve 222 is provided with the radially extending flanges 224 and 226 in an axially spaced-apart relationship, and at the outer end thereof mounts a roller 228, the sleeve and roller assembly being slidable on the shaft 220. Shaft 220 is positioned to bring the roller 228 just over the forward end of the belt 178, that is, just above and to the left (as drawn in FIG. 2) of the sprocket wheel 176. In its normal position, the roller 228 rides on, or closely adjacent, the top surface of belt 178. By this construction, when the knob 180 rounds the sprocket wheel 176, it strikes the roller 228, and moves the latter upwardly to actuate the extension 218 in a clockwise direction about shaft 210, thus rotating the pawl-controlling plate 212.

It has been mentioned that the sleeve 222 is slidable on shaft 220, and the means for doing this will now be described: a yoke 230 (see FIGS. 8, 10 and 11) has its legs fitting around the sleeve 222 between the flanges 224 and 226. The other end of this yoke is fastened to a pin-extension 232 at the end of a shaft 234 which is journaled in a bearing 236 mounted on the inside face of the frame side 82. A cone-shaped collar 238 is provided at the end of shaft 234, intermediate the pin extension 232 and the main part of the shaft. A radially extending boss 239 is provided at the end of the cone. During operations of the machine under the control of the preselector push buttons 8 and 10, the shaft 234 and thus cone 238 are in the position shown in FIG. 8, the cone fitting in a suitably provided recess 240 in the frame member 82, and shaft 234 being biased to the left by the compression spring 242. In this normal position, the roller 228 is, as mentioned above, positioned over the belt 178. However, if the shaft 234 is pushed to the right, (looking at FIG. 8) it will move the yoke 230 and thus move the roller outwardly to be out of the way of the belt 178, and thus out of the way of the knob 180. As the cone thus moves, the boss 239 strikes the finger 192 to swing it outwardly.

Shaft 234 may be pushed outwardly, as described above, by means of a bell crank 244 (see FIGS. 7, 11 and 19) which is journaled on a pin 246 held in a bearing 248 on the frame member 84.

As has been indicated above, when the knob 180 strikes the roller 228, it lifts the finger extension 218 of plate 212 and depresses the plate downwardly, that is, it rotates the plate 212 on the shaft 210 in a clockwise direction as viewed in FIG. 10 for example. When this happens, the finger extension 192 of the bracket 182 that supports the trip plate is enabled to swing counter clockwise to bring shoulder 194 under the bottom edge 334 of the flange 216, and thus hold the pawl-control plate 212 in its clockwise-rotated position. If, now, the trip plate 182 is rotated by the knob 180 about its pivots 188 and 190, then this action withdraws the shoulder 194 set from underneath edge 334, allowing the pawl controlling plate 212 to return to its upward position. At the same time, roller 228 is returned to its position adjacent timing belt 178.

Journaled on the end of shaft 210 is a lever 250 (see FIGS. 6, 10 and 11), the lever being supported on the shaft by having a downwardly extending portion return bent on itself to form a yoke 252 having legs which are bored to receive the shaft 210. At one end, the lever 250 terminates in an outwardly bent finger 254, this finger being so positioned as to overlie the arm 154 of the Z-plate 150, with the result that when the Z-plate is tilted in a clockwise direction as drawn in FIG. 6, the end of arm 154 will strike the finger 254, thus rotating the lever 250 about its support.

The other end of the lever 250 is provided with a laterally-bent extension 256 on which is provided a catch hook 258. The face of extension 256 serves as a means for depressing the plunger 260 of a switch 262 when the lever 250 is rotated about its axis 210.

Extension 256 is also provided with an upwardly-standing tab 264 having a bent over top 265, the purpose of which will be described later.

A tension spring 266 having one end fastened to the plate 212 and the other end fastened to side 84 serves to bias the plate 212 in a counter-clockwise direction (as viewed in FIG. 10) about its shaft 210.

A lever indicated generally by numeral 268 (see FIG. 10) and having the four arms 270, 272, 274 and 276, is mounted rotatably on the frame side 82 by forming the end of arm 270 in a return bend to form a yoke 278, the legs of which are bored to receive a shaft 280 which is suitably affixed to frame side 82. Arm 272 extends below the timing belt 178 and has rotatably mounted at its end a roller 282, the roller being directly beneath the timing belt.

A plate 284 (see FIG. 2) is mounted on side 82 so as to project laterally therefrom and between the loops of the belt 178. It is positioned to lie just above the bottom loop. If, now, the knob 180 (during the motion of the belt in a clockwise direction as shown in FIG. 2) is interposed between the fixed plate 284 and the roller 282, it will move the roller downwardly, and thus lever 268 will be rotated in a clockwise direction (as viewed in FIG. 2) about its mounting shaft 280. A tension spring 288 biases lever 268 counterclockwise about its mounting shaft, the spring having its ends fastened to the frame side 82 and the lever 268.

The end of arm 274 is formed in the shape of a hook 286. When the lever 250 is rotated about shaft 210 to move the hook 258 downwardly (as viewed in FIG. 10), the hook 286 (under the bias of spring 288) engages hook 258 to prevent the return of lever 250 to its former, unhooked position. Thus, arm 274 holds the push button 260 in a switch-closed position. It is to be noted that when the lever 268 is rotated clockwise about its shaft 280 by the knob 180 on belt 178, it lifts the hook 286 to release the arm 250 into a switch-open position.

The other arm 276 of the lever 268 has a curved end 290 in order to clear the cone-shaped collar at the end of slidable shaft 234. However, if the bell crank 244 is rotated to move the cone outwardly as described above, and at the same time the lever 250 is depressed to close the switch 262, the rotation of lever 250 (and thus downward movement of hook 258) permits the arm 274 to drop and thus the arm 276. The curved end 290 of arm 276 drops between the inner face of cone 238 and the face of frame side 82 to lock the shaft 234 with its cone 238 in an outward position, thus maintaining the roller 228 clear of the belt 178. (In order to prevent wobbling of the end 290 of lever 268, and also to guide it downwardly in its locking action, a slotted bracket 292 may be mounted against the face of frame member 82 (see FIG. 6) the slot at the upper end thereof receiving the end 290.)

Turning now to FIG. 12 for a description of the pawl-controlling plate 212 and the pawl and detent arms controlled thereby, there is also mounted on shaft 210 so as to swing thereon a pawl arm 294 and a detent arm 296. For rotational support purposes, a yoke 298 is formed at the end of pawl 294, and yoke 300 at the end of detent arm 296, the arms of the yokes being provided with bearing holes for shaft 210. At the upper end of pawl 294 a finger 302 is formed, the end of which is engaged by the adjusting screw 304 which is threadably engaged in a threaded hole in the plate 212 as shown. The lower end of pawl 294 engages a ratchet wheel 306 which is a part of a clutch mechanism for controlling the dispensing of tape and which will be described below. Detent arm 296 is provided at its lower end with a tab 308 extending laterally of the tab and downwardly in order to engage another part of the drive clutch mechanism to prevent operation of the cut-off knife as will be explained below. Detent arm 296 is provided with the shoulders 310 and 312 along the bottom edge thereof, as shown.

A U-shaped stirrup member 314 is provided having the arms 316 and 318, the ends of which are suitably bored to receive freely a shaft 320 which is journaled in flanges 322 and 324 dependent from plate 212. The stirrup 314 envelops the detent arm 296, the bight 326 thereof being positioned to engage either of the shoulders 310 or 312. Arm 316 is extended to form a finger 327 which is a cam-follower, and is positioned to engage a cam member 328 which is formed as a portion of that part of the clutch mechanism which actuates the cut-off knife. Stirrup 314 is biased about its mounting shaft 320 in a clockwise direction (as viewed in FIG. 12) by a hairpin spring 330 one end of which bears against the plate 212 and the other end of which bears against the edge of cam-follower finger 327.

The pawl arm 294 and the detent arm 296 are rotationally biased toward each other about the shaft 210 by means of the hairpin spring 332, the ends of which engage the edges of these two arms respectively.

With the above construction, it will be noted that if the plate 212 is depressed downwardly (that is, clockwise as viewed in FIG. 12) the engagement of the end of extension 302 by the adjusting screw 304 will rotate the pawl arm 294 so that its lower end frees the ratchet wheel 306. Also, when plate 212 is depressed, it moves the shaft 320 downwardly (that is, in an arc about the shaft 210) and permits the bight 326 of stirrup 314 under the influence of the biasing spring 330, to slip underneath the shoulder 310. This motion does not disturb the aforesaid engagement of the end 308 of the detent arm with the clutch mechanism, and consequently the cut-off mechanism does not operate. This motion of stirrup 314 is permitted, because the eccentricity of the cam 328 lies to the left of its shaft, (as viewed in FIG. 12) when the cut-off mechanism is at rest.

When, during the operation of the mechanism, the plate 212 is permitted to lift again under the influence of its biasing spring 266, the bight 326 will follow the lift of plate 212 and will lift the detent arm end 308 to permit the cut-off mechanism to be actuated by the respective clutch mechanism. At the same time, the lifting of the cam plate 212 reengages the end of the pawl arm 294 with the ratchet wheel 306 and stops the operation of the tape feed mechanism. As the cut-off clutch rotates, cam member 328 rotates clockwise, as viewed in FIG. 12 and indicated by the arrow, and the eccentricity or throw of the cam will swing the cam follower arm 327 about its axis 320, thus pulling the bight 326 away from shoulder 310 and permitting it to drop into shoulder 312. This releases the detent arm 296 to drop to stop the operation of the cut-off clutch. Thus, by means of the detent arm 296 and the stirrup 314 the cut-off mechanism is a one revolution cut-off device. That is, the movable arm 40 will be moved up by the cam followers 70 to sever the paper and then be retracted to clear the mechanism for the issuance of the next length of tape, at which point the cam follower arm 327 operates to stop the action of the cut-off mechanism drive.

On the tape dispensing apparatus, means are provided to repeat a given length without again pushing on a push button actuator, and also means to get a random length. Both of these will now be described.

Figure 20:
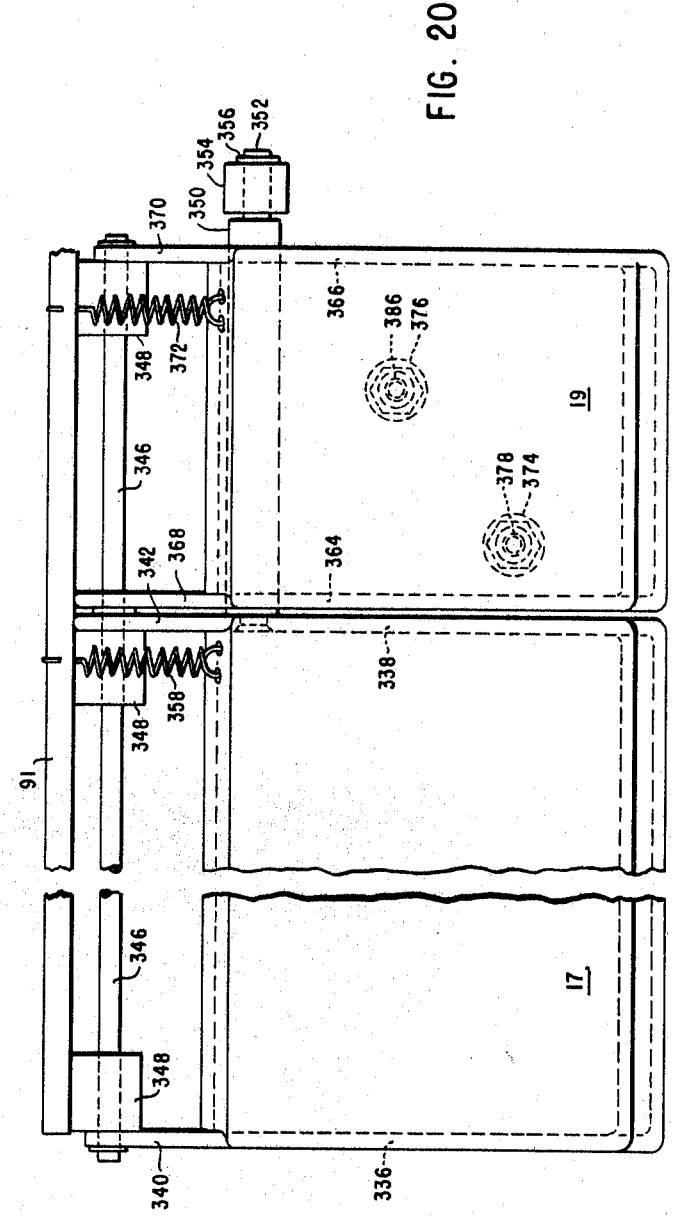
FIG. 20 is a plan view of the FIGS. 18 and 19 constructional details.

As indicated earlier in this description, movable plate 16, when depressed, repeats the length of tape that was last dispensed. Plate 16 is a cover plate for a mechanism below it which is now described: Referring to FIGS. 18, 19 and 20, a plate 17 is shown as having the downward turned flanges 336 and 338, one at each side, these side flanges being provided with finger extensions 340 and 342.

Holes 344 are provided at the ends of these fingers in order to journal the plate 17 on a supporting shaft 346, this shaft being correspondingly journaled in bearing studs 348 which are mounted by conventional means to the back support plate 91. A push rod 350 is riveted or otherwise attached by one end thereof to the flange 342 and extends to the right therefrom as viewed in FIG. 19. At the other end of the push rod is provided a neck 352 which rotatably mounts a roller 354 by means of a conventional snap ring 356 engaging a peripheral groove at the end of the neck 352.

When plate 17 is mounted on the bearings 348, the roller 354 is positioned over the top 265 of tab 264 at the end of lever 250. If, now, plate 17 is rotated about its shaft 346, it will bring the roller 354 to bear downwardly against the end of tab 264, thus rotating lever 250 clockwise about its shaft 210 into a contact-closing position of the switch 262. When it has reached this position, the hook 258 is engaged by the hook 286 to hold the switch in a contact-closed position. This, then, starts the motor running. Upon starting the motor, the timing belt is energized and moves knob 180 underneath roller 228 to actuate pawl plate 212. Subsequent operation of the pawl arm 294 and the detent arm 296 to provide tape dispensing and cut-off, respectively, followed by motor-stopping, are the same as first described above in respect to the operation of these parts.

The plate 17 is normally held in its inoperative position by means of a tension spring 358 which is hooked to the back edge of the plate 17 by one end and to the back frame member 91 by the other end. Plate 16 may be attached to plate 17 in any conventional manner, such as by the use of mounting studs (not shown), which does not interfere with the motion of plate 17. (Plate 16 is provided to cover plate 17, and may be styled to harmonize with the rest of the machine. However, it may be eliminated, if desired.)

As has been mentioned earlier, occasionally in the use of the tape dispensing machine it will be found advantageous to obtain a length of tape at the will of the operator independently of the setting of the tape-length push button selectors. The details of how this is done on the present machine are as follows:

Cover plate 18 is provided, and like cover plate 16 has mounted beneath it, for operation thereby, an operating plate 19. Plate 19 has the dependent side flange 364 and 366, the side flanges being continued, respectively, as the finger extensions 368 and 370. Holes are provided through the ends of extensions 368 and 370 in order to receive the shaft 346, and thus mount the plate 19 rotatably on the bearings 348. The side flanges 364 and 366 are relieved, as shown in FIG. 18, in order just to clear the push rod 350. A spring 372 normally biases the plate 19 about the shaft 346 upwardly, that is, clockwise as viewed on FIG. 18.

A pair of mounting studs 374 and 376 are fastened to the underside of the top of plate 19, and into these are respectively screwed the adjustable push rods 378 and 380, each of these push rods being locked in its respective stud by means of a conventional lock nut 382 and 384 respectively. The mounting studs 374 and 376 are positioned on the plate 19 so as to bring push rod 378 over the end of the bell crank 244, to bring the push rod 380 approximately over the center of the plate 212.

When the plate 19 is depressed (that is, in a counter clockwise direction about its mounting shaft 346) simultaneously the push rod 378 rotates the bell crank 244 about its mounting shaft 246 to move the slidable shaft 234 to the right (as viewed in FIG. 19), and push rod 380 depresses plate 212. The sliding of rod 234 to the right, as described above, moves the roller 228 to the right, and thus moves it out of the way of the knob 180 on the timing belt 178. The movement of plate 212 removes the pawl arm 294 from engagement with the ratchet wheel 306. At the same time that the bell crank 244 and plate 212 are thus moved, the under edge of the side flange 366 pushes the push rod 350 downwardly, which in turn depresses the top 265 of lateral tab 264 at the end of lever arm 250 to close the contacts of switch 262 and start the motor running. The timing belt is now rotated, but because roller 228 has been moved out of the way, knob 180 does not strike it. The knob moves around until it is interposed (as viewed in FIG. 13) between the roller 136 at the end of push-button actuator 8, and this depresses the trip plate 182. However, the depressing of the trip plate 182, as long as the plate 19 is held down manually, accomplishes nothing. As the knob 180 continues to move, it eventually is interposed between the fixed plate 284 and the roller 282 at the end of arm 272. Again, this arm is depressed, but such motion accomplishes nothing because the lever 250 is being held in a contact-closing position by flange 366 forcing the push rod 350 into a position holding the switch in a contacts-closed position. The machine will therefore dispense tape until plate 18 (and thus plate 19) is relieved of manual actuation.

After a length of tape has been dispensed to meet the operator's requirement, the plate 18 is released. Immediately the latter is done, the pawl 294 is moved in to engage ratchet wheel 306 to stop the feeding of tape, and detent 296 is lifted to actuate the cut-off mechanism. (When plate 18 is released, the pawl plate will rise because notch 194 in finger 192 has not been permitted to engage the bottom edge 334 of flange 216 of pawl plate 212, the finger being held out of the way by the boss 239 on the cone 238.) After cut-off, the lever arm 272 is depressed and it releases the hook 286 from the hook 258 to open the switch 262 and stop the motor. At the same time, the end 290 of arm 276 is raised from its interposition between the back side of the cone 238 and the frame side 82, thus permitting the slidable rod 234 to return to the position shown in FIG. 19.

IV. SPRING CLUTCH DRIVE MECHANISM FOR TAPE FEEDING AND CUT-OFF

Turning now to FIGS. 11 and 13, the drive mechanism for the machine comprises an electrical motor 390 which is mounted against the frame member 82 horizontally by conventional means, in such a position as to clear the passage of tape beneath it. The shaft 392 of the motor freely passes through side 82 and is provided with two sprocket wheels 394 and 396, one of these being used to drive the larger sprocket wheel 398 which is mounted by a shaft in a conventional bearing 399 on the side 82. A sprocket chain 400 is trained on the sprocket wheels 394 and 398. Also, mounted on the shaft which supports the sprocket wheel 398, and turning with the latter, is the sprocket wheel 402. This wheel drives the toothed belt 404 which is trained on a sprocket wheel 170 mounted on the shaft 168. Thus, the motor drives the timing belt 178 through this chain and belt linkage.

The other sprocket wheel 396 on the motor shaft drives the sprocket chain 406 which is trained on a larger sprocket wheel 408, the latter being fixed to the input drive shaft 412 of the clutches by means of which both the tape feed rollers and the cut-off mechanism are controllably driven.

Referring now to FIGS. 14–17, a clutch mechanism, indicated generally by numeral 410, has an input shaft 412, one end of which is journaled in a conventional bearing (not shown) in the frame plate 82. Mounted on the shaft 412 and pinned thereto by the pin 414 is a drive drum 416. Adjacent frame side 82 (but separated therefrom by the bearing washer 418) there is rotatably mounted on the shaft 412 the driven cut-off drum 420. Drums 416 and 420 are of equal diameter, and drum 420 is provided with a neck 421.

A sleeve or barrel member 422, having at the closed end thereof the eccentric cam 328, is fastened by conventional means to one end of the cut-off drum 420 to turn therewith, for example by providing the barrel with a bore to receive neck 421 and then upsetting the end of the neck, as drawn. Barrel 422 is concentric with the cut-off drum 420.

There is provided a helical clutch drive spring 424 some of whose turns surround and grip drive drum 416 and whose other turns surround the cut-off drum 420. One end 426 of the spring engages a recess 488 provided at the inner end of the barrel member 422. The other end 430 of this spring projects outwardly in a radial direction and is received in a notch 432 which is provided at the outer end of the barrel 422. (See FIG. 16.)

It will be noted that the tab 308 at the end of the detent arm 296 is adapted to fall into notch 432 to engage the end 430 of the spring 424. When this tab is in the position shown in FIG. 16, it prevents the spring 424 and the cut-off drum, barrel, and cam structure (420, 422, and 328) from rotating. It will be noted that in this instance, notch 432 is shown extending 180° around the perimeter of the barrel. This is not necessary, since the reason for providing the notch is to permit the tab 308 to engage the barrel and spring end simultaneously to stop rotation of the barrel. If desired, an axially-extending stud could project from the end of the barrel, and end 430 of the spring could rest against the stud, spring end and stud to be engageable by tab 308. The direction of winding of the spring 424 is such that with the end of the spring engaged by the tab 308, the turns of the spring surrounding the cut-off drive drum 416 are loose. On the other hand, when the tab 308 is lifted away from the spring end and the barrel as explained earlier, the spring is permitted to assume its normal position in which it grips the drive drum 416. Rotation of the drive drum will then rotate the cut-off clutch drum 420. The detent arm 296 and cam follower 327 thus act as a control to provide a single revolution of cut-off clutch drum.

At the other end of the input shaft 412 there is mounted a second output drum 434 which rotates the tape feed roller 458. Drum 434 has a tubular shaft extension 438 which is suitably journaled by a conventional bearing (not shown) in the support plate 90. The bore 436 of shaft 438 is adapted to receive rotatably the end of the drive shaft 412 and act as a bearing therefor. Shaft extension 438 extends horizontally across the machine, and is conventionally journaled in the support plate 90 (see FIG. 13).

Surrounding the output drum 434 and concentric therewith is the barrel member 440 which is pinned to the shaft extension 438 by pin 441.

Surrounding the right-hand end (as viewed in FIG. 14) of the drive drum 416 and the feed-roll output drum 434 is a helical spring 442, this spring fitting into the space provided between the inside of the barrel 440 and drum 434, some of the turns of this spring gripping drum 434, and the others gripping drum 416. One end 444 of this spring is held in a recess 446 provided in the barrel 440, and the other end 448 of this spring is engaged in a suitably provided hole or recess 450 in the ratchet wheel 306. If the ratchet wheel 306 is stopped from rotating by engagement therewith of the pawl arm 294, then the direction of winding of the turns of the spring 442 is such that the grip of the turns on the drive drum 416 will be relieved, and thus the drive drum will not turn the output feed drum 434.

The collar 452 is provided to prevent damage to the coils or turns of the spring 442 when the feed is suddenly stopped, the spring turns expanding against the inner wall of the collar. This expansion against the collar also provides a braking force.

Slidably fitted onto the shaft extension 438 in a sleeve 454, which is pinned thereto in conventional manner, for example, by a set screw 456. Mounted on the sleeve 454 are four rubber rollers 458 (see FIGS. 7 and 9).

A pinion 460 is mounted at the outer end of shaft 438 to be turned thereby, and engages (when the upper support base 80 is in its down or operating position) the pinion 68 at the end of shaft 64 on which roller 22 is mounted.

Rubber rollers 458 are adapted to engage the rubber roll 22 which has been indicated to be rotatably mounted on the base, and when tape is passed between these rolls, the frictional engagement will feed the tape from the machine as the feed rolls 458 are rotated by their drive.

To complete the description of the upper support frame and elements supported thereby, other features are as follows:

A weight structure for holding the gummed side of tape against the water brush 28, as the tape is being dispensed, comprises the pair of plates indicated generally by numeral 470 each of which has a rectangularly-shaped base portion 472 and an upstanding leg 474 at each end thereof. The bottoms of the weights are fastened to a pressure plate 476 having an upturned inner edge or lip 478, the plates being separated sufficiently to straddle the side 84. Each of the legs 474 is provided with a slot 480, the slots being in alignment as between the front and back legs at each end of the plates. Guide pins 482 are suitably fastened into side 84 and project therefrom and into the slots 480 to guide the weights in sliding relation to frame side 84. The up-turned lip 478 serves to guide the forward end of the tape being dispensed under the pressure plate 476.

Mounted between the frame side member 86 and the back end of support plate 90 on suitable bearings is a tape guide roll 484.

Knife blade 50 is attached to the underside of the support 80 by providing a mounting bar 462 having a lengthwise rabbet 464 therein. The knife is held in rabbet 464 by a flat spring clip 466, one at each end of bar 462, which overlaps the blade as shown, the clips being held to the bar by screws in conventional manner. Bar 462 spans the bottom edges of support 80 and side 86 and is fastened thereto.

A guide plate 467 underlies the rollers 458 to guide tape between these rollers and roller 22, this plate being attached to a backwardly extending flange 468 by means of screws 469. Plate 467 is provided with suitable slots in conventional manner through which project the rims of rollers 458 for engagement with roller 22.

As has been indicated, the support member 80 can pivot away from the base 2 for maintenance and inspection purposes. When the support is in its normal operating position, as shown in the several drawings, it may be latched in the down or operating position, if desired by any of a number of conventional latches, not shown since such latches are not a part of this invention.

V. TAPE ROLL HOLDER AND GUIDE

Figure 21:
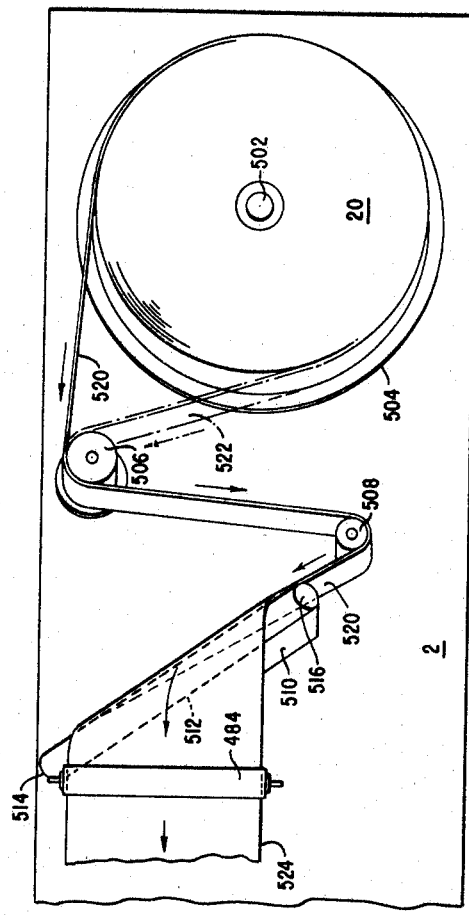
FIG. 21 is a plan view of a portion of the machine showing a means for holding a roll of tape, and means for guiding a strip of tape as it passes from the roll into the feed rolls of the apparatus.
Figure 23:
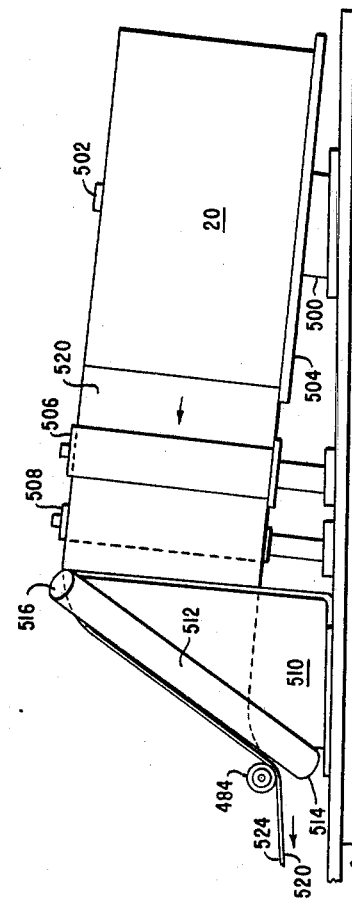
FIG. 23 is a side view of the FIG. 21 portion of the machine.
Figure 22:
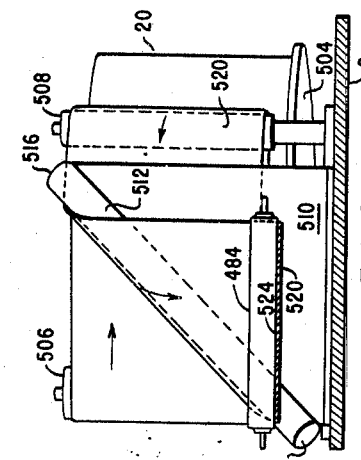
FIG. 22 is a view of the FIG. 21 portion, taken in the direction of sight lines 22—22 thereon.

Referring now to FIGS. 21–23, there is shown a mechanism for supporting a roll of tape 20 with its axis pointing in an upward direction for easy removal and implacement, and a tape guiding system so made and arranged that a roll of tape can be used with the gummed surface lying on the outside of the tape, or gum on the inside.

Mounted on base 2, at an angle thereto on suitable bearings of the conventional nature is a spindle 502, at the lower end of which, and rotatable therewith, is a platform 504 to support the tape roll 20. A rotating tape guide spindle 506 is provided on the base 2, using suitable bearings, and another rotating tape guide spindle 508 is likewise mounted on base 2 on suitable bearings. The bearings for spindle 506 and 508 are inclined to the plane of the base 2 the same amount as in the spindle 502.

It is to be noted that preferably the spindles 502, 506, and 508 are mounted at the indicated angle to the plane of the base 2, but this is not necessary. These spindles can be vertical to the plate 2 if desired.

Also mounted on the base 2 is an inclined tape guide member 510, this guide having its upper edge 512 curved in cylindrical shape in order to provide a smooth surface over which the tape can pass during dispensing thereof. This curved upper edge preferably takes the form, as shown, of turning the edge back on itself to provide the curved surface. It is to be noted that the upper edge 512 is inclined to the plane of the base 2, the preferred angle being approximately 38°.

It is also to be noted that the tape guide 510 as a whole is inclined to the longitudinal center line of the base 2 at an angle of approximately 55°. In this position its lower end (indicated by numeral 514) is located adjacent the tape guide roll 484, and its upper end 516 is located adjacent the upper end of the spindle 508.

The angle of the spindles 502, 506 and 508 to base 2, and the inclination of the tape guide 510 and its angular lengthwise relationship to the base 2, are matters of adjustment. The function of the tape guide member 510 is to turn the tape over from its upstanding orientation to the base 2 (as it leaves the roll 20) so that it lies, at the time it reaches the tape guide roll 484 approximately parallel to the base 2. It is obvious that changing the angle of orientation of the tape guide member to the lengthwise axis of the base 2, and changing the angle of incline of curved edge 512 to the base 2, may be done and yet still have the combination rotate the plane of the tape. If the angles above are used, and if the angle of each of spindles 502, 506, and 508 is approximately 86° to the base, then, it will be found that the operation will be satisfactory. These angles are exemplary only and have been found to work.

In order to use the apparatus thus described, the roll of tape 20 is mounted by sliding its core down over the spindle 502. If, now, as thus mounted, the gummed surface 520 of the tape is on the inside, the free end of the tape is threaded from one side of the roll first around spindle 506, around spindle 508, over the curved surface 512 of the tape guide member 510, and then underneath the tape guide roll 484. It will be noted that thus the gummed surface is downwardly, and thus is in position to be contacted by the wet brush 28 for wetting. On the other hand, if the gummed surface is on the outside of the roll (as indicated by numeral 520) then the tape is fed from the other side of the roll 20 (as indicated by the dotted lines) around the spindle 506, around the spindle 508 and over the curved surface 512. Again, from the geometry of the construction, it will be noted that the gummed surface of the tape is again downwardly (that is, facing the base 2) and thus is in position to be contacted by the wet brush 28 for wetting. In each of these instances, it will be noted that as the tape passes around spindle 508, the gummed surface of the tape lies on the outside.

VI. OPERATION

While the operaton of the several sub-combinations has already been described in the sections dealing with their constructions, nevertheless, it will be instructive, for a complete understanding of the operation and advantages of the machine, to describe one complete cycle of the apparatus in dispensing tape, starting with all of the parts in the position in which they are left when a length of tape has been previously dispensed and cut off.

The various parts will therefore be in the following condition: the knob 180 has just passed the roller 282 at the end of arm 272 to rotate the lever 268, this rotation, as aforesaid, having stopped the motor by releasing the lever 250 to permit the switch plunger 260 to move to a contacts-open position. The pawl controlling plate 212 in its upper position, the pawl arm 294 is engaging the ratchet wheel 306, the detent tab 308 is engaging the barrel 422 and the end 430 of spring 424, thus having stopped the cut-off knife drive so that the cam 328 and the cam followers 70 are in such a position that the movable knife blade 30 is retracted. Since the ratchet wheel 306 is engaged, the tape feed output drum 434 is at rest, and no tape is being dispensed. Assume that the push buttons 8 and 10 are in the position shown in FIG. 6.

In order to dispense a length of tape, button 10 is now pushed downwardly. The result of this is to cause the cone detent 142 on tail 122 of button 10 to move to the leftward, as viewed in FIG. 6, to engage the latch detent 160 on the Z-bar 152. As it does so, it rotates the Z-bar clockwise about its pivots, thus releasing the push button 8. The roller 136 at the end of push button 10 has now been positioned over the drive belt 178 by the latch engagement of the cone 142 with hook 160 of the Z-bar.

As the Z-bar 142 is rotated, a slight further downward push of push button 10 will cause the arm 154 of the Z-bar to move upwardly to strike the laterally extending tab 254 at the end of lever 250. Lever 250 is rotated about its shaft 210, to push the switch plunger 260 into a contact-closed position. It is held in its position by the engagement of the hook 286 (at the end of lever arm 274) with the hook 258 at the end of lever 250. The motor now operates, and knob 180 on timing belt 178 is moved by the latter around the sprocket wheel 176 until it strikes against the roller 228. This swings the roller and its shaft 220, upwardly (as viewed in FIG. 3) and since shaft 220 is mounted at the end of the finger extension 218 of the pawl plate 212, the latter is rotated clockwise about its shaft 210.

As the pawl plate rotates clockwise, set screw 304 strikes the upper end 302 of the pawl arm 294 to rotate the latter about shaft 210, thus freeing the lower end of the pawl arm from engagement with the ratchet wheel 306. Freeing the ratchet wheel now permits the drive drum 416 to drive (by means of the helical spring 442) the tape-feed drum 434. This action starts a length of tape feeding, because the feed drum 434 rotates the rollers 458 and 22 to issue tape from the machine.

Feeding continues until the knob 180 moves far enough along the top surface of the trip plate 182 to strike the previously positioned roller 136 at the end of pushbutton 10. Since roller 136 is held immovably by the engagement of the detent catch 142 with the Z-bar hook 160, the trip plate 182 is moved downwardly by the interposition of the knob 180 between it and the roller 136. Motion downward of the trip plate moves the end of finger 192 (on the bracket supporting the trip plate) clockwise (as viewed in FIG. 7) about its pivot 188, thus releasing the bottom edge 334 of the down-turn flange on plate 212, thus permitting plate 212 to move to its original position. As it does so, the end of pawl arm 294 re-engages the ratchet wheel 306 to stop it. Stopping of the ratchet causes the turns of spring 442 which encircle drive drum to loosen, and feed drum 434 now stops.

As plate 212 moves to its original position, it carries upwardly with it the stirrup 314, the bight 326 of the latter moving the detent arm 296 upwardly with it, thus pulling the tab 308 away from the spring end 430 and the notch 432 in barrel 422. Release of the end of spring 424 permits these turns surrounding drive drum 416 to grip the latter and thus rotate the cut-off drum 420. Cut-off drum 420 now rotates, turning the cam 328 with it and thus moving the cam followers 70 to rock the V-shaped cam follower yoke 24 and thus turn shaft 32. Rotation of shaft 32 moves lever 40 (see FIG. 12) upwardly, carrying movable knife blade 30 with it to sever the tape. As the cam 328 continues to rotate, it moves to actuate the cam follower 327, thus moving the stirrup member 314 and its bight stirrup 326 counter-clockwise (as viewed in FIG. 12) about the shaft 320. Withdrawal of the bight 326 from underneath shoulder 310 permits the detent arm 296 to fall, and the detent tab 308 then reengages the spring end 430 and the barrel notch 432, thus stopping the knife actuation at its bottommost point.

Both the tape feed drum 434 and the cut-off drum 420 are now at rest, although the motor is still running.

Meanwhile, the knob 180 has continued to be moved by the belt around the other sprocket wheel 176 until the knob is interposed between the fixed stop plate 284 and the roller 282 at the end of arm 272. This interposition moves this arm clockwise about its shaft 280 (see FIG. 2) thus lifting the lever arm 274 to disengage the hook 286 from hook 258. This permits lever 250 to move counter-clockwise about shaft 210, thus permitting the plunger 260 to move to its contact-open position. This stops the motor.

Meanwhile, as plate 212 has rotated counter-clockwise (see FIG. 10) about its shaft 210, the roller collar 228 has been moved down again to its position adjacent the belt 178 over the sprocket wheel 176. The apparatus is now ready for another length of tape to be dispensed, either the same length as before by depressing plate 16, or a different length by pushing button 8 downwardly to unlatch button 10 and start the cycle.

It will be noted that the length of tape that is dispensed depends upon the distance that the belt moves from the time it pushes roller 228 upward, to the time that the knob 180 moves to the roller 136 at the end of push button actuator which has been locked to the Z-bar. It is obvious, therefore, that by sliding a selector button lengthwise along the guide rod 112 to change its distance from roller 228, this will also change the length of tape that is dispensed from the machine as determined by the setting of particular selector button.

Presumably, two different lengths of tape will need to be dispensed in the average use of the machine. Each of the push button actuators 8 and 10 is, therefore, accordingly set to the desired lengths of tape. After the length of tape determined by push button 10 has been dispensed, then the push button 8 is pushed downwardly. Pushing button 8 downwardly releases button 10, as described above, and engages its cone detent 142 with the Z-bar arm 158 thus positioning the roller 136 at the end of button 8 over the timing belt 178. When push button 8 is pushed downwardly, it moves the cam surface 104 of its detent 142 inwardly (that is, to the right as viewed in FIG. 13) to tilt again the Z-bar and actuate the tab 254 to cause the length of tape for which the push button actuator 8 is set, to be dispensed from the machine.

It will also be noticed that because of the latching arrangement and relationship between the Z-bar 152 and the detents 152 on the push buttons 8 and 10, it is impossible to have more than one of the push buttons latched to the Z-bar at one time, the latching action of one push button to the Z-bar causing unlatching of any other push buttons that may be on the guide bars 112. It is also obvious that while two push button actuators have been shown, any number of push button actuators can be used with this invention for various lengths of tape.

In view of the above, it will be seen that the several objects of the invention are achieved, and other advantageous results attained.

It is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Having described the invention, what is claimed is:

1. Apparatus for dispensing a predetermined length of tape from a source thereof comprising:
   a base;
   drive means for feeding a length of tape from said source and ejecting the length from the base;
   cutting means for severing the tape after said length has been ejected;
   a motor for operating the apparatus;
   control means for the motor;
   adjustably positionable manually actuable means for determining the length of tape to be dispensed, and for actuating said control means into motor-running condition;
   releasable holding means for releasably maintaining said control means in its motor-running condition;
   releasing means for inactivating said control means from its motor-running condition, thereby to stop the motor;
   a first means for operatively connecting said drive means with said motor so as to be driven thereby;
   first actuating means for controlling said first means;
   first motor-actuated means for operating said first actuating means;
   a second means for operatively connecting said cutting means with said motor so as to be driven thereby;
   second actuating means for controlling said second means;
   second motor-actuated means for operating said second actuating means; and
   third means operated by said motor for actuating said releasing means to stop the motor.

2. The apparatus of claim 1 in which said first means is a mechanical clutch.

3. The apparatus of claim 1 in which said second means is a mechanical clutch.

4. The apparatus of claim 1 in which said first means and said second means are each clutches operating on a common drive shaft, the latter being driven by said motor when said motor is running.

5. The apparatus of claim 1 in which said adjustably positionable manually actuable means comprises:
   an elongated latch plate pivoted on said base to rotate about an axis running the length of the plate;
   a slider mounted on the base on longitudinal guide means lying adjacent the latch plate, and the slider being adapted to be moved longitudinally on the guide means, the slider extending toward the latch plate and having an end adjacent the latter, the slider being adapted to swing toward the latch plate;
   a catch member attached to the latch plate and extending longitudinally thereof, the slider being provided with a latch adapted to engage said catch, when the slider is moved toward the latch plate, to lock the slider in its position;
   an elongated trip plate pivoted on said base to rotate about an axis parallel to and in the same plane as the pivots of the latch plate, the trip plate being spaced from said end of the slider; and
   means movable along the surface of the trip plate and adapted to be brought into interposition between said end and said trip plate to cause rotation of the latter.

6. The apparatus of claim 5 in which said adjustably positionable manually actuable means comprises:
   an elongated latch plate pivoted on said base to rotate about an axis running the length of the plate;
   a plurality of sliders mounted on the base on longitudinal guide means lying adjacent the latch plate, each slider being adapted individually to be moved longitudinally on the guide means, each slider extending toward the latch plate and having an end adjacent the latter, and each slider being adapted to swing toward the latch plate;
   a catch member attached to the latch plate and extending longitudinally thereof, each of said sliders being provided with a latch adapted to engage said catch member, when the slider is moved toward the latch plate, to lock said slider in its position, the latch on each one of said sliders cooperating with said catch member to release the latch engagement therewith of any others of said sliders when said one slider is moved into locking position.

7. The apparatus of claim 5 in which said last named means is an endless belt driven by said motor, said belt having attached thereto a protuberance thicker than the distance between said end of said slider and said trip plate, whereby said protuberance, in passing between said end and the trip plate, rotates the trip plate about its axis.

8. The aparatus of claim 5 in which said latch plate, in rotating about its axis, is adapted to actuate said control means into motor-running position.

9. The apparatus of claim 1 in which:
said motor is an electrical motor;
said control means is a switch for connecting said motor to a source of electrical energy;
said releasable holding means is a first pivoted member positioned to open and close said switch, said first pivoted member being releasably maintainable in switch closing position by said releasing means; and
said releasing means is a second pivoted member engaging, when in one position, said first pivoted member to hold the latter in switch closing position, and movable to another position to free said first pivoted member.

10. The apparatus of claim 9 in which:
said first means is a first spring clutch;
said first actuating means is a first pawl actuable to cause said first clutch to connect and disconnect an input drive shaft with an output shaft; and
said first motor-actuated means is a pivoted member adapted to move said first pawl to actuate said first spring clutch.

11. The apparatus of claim 9 in which:
said second means is a second spring clutch;
said second actuating means is a second pawl actuable to cause said second clutch to connect and disconnect an input drive shaft with an output cam member; and
said second motor-actuated means is a pivoted member adapted to move said first actuating means to cause the latter to disconnect operatively said drive means from said motor; and to move said second pawl to actuate said second spring clutch.

12. The apparatus of claim 9 in which said first means and said second means are each clutches operating on a common input drive shaft, the later being driven by said motor when said motor is running.

13. Apparatus for dispensing a predetermined length of tape from a source thereof comprising:
a base;
drive means for feeding a length of tape from said source and ejecting the length from the base;
cutting means for severing the tape after said length has been ejected;
a motor for operating the apparatus;
a switch for the motor;
adjustably positionable manually actuable means for determining the length of tape to be dispensed, and for moving said switch into motor running position;
releasable holding means for releasably maintaining said switch in its motor running position;
releasing means for disengaging said holding means from its motor running position;
a first clutch for operating said drive means;
first actuating means for controlling said first clutch;
first motor-actuated means for operating said first actuating means;
a second clutch for operating said cutting means;
second actuating means for controlling said second clutch;
second motor-actuated means for operating said second actuating means; and
third means operated by said motor for actuating said releasing means to stop the motor.

14. The apparatus of claim 13 in which said adjustably positionable manually actuable means comprises:
an elongated latch plate pivoted on said base to rotate about an axis running the length of the plate;
a slider mounted on the base on longitudinal guide means lying adjacent the latch plate, the slider being adapted to be moved longitudinally on the guide means, the slider extending transversely toward the latch plate and having an end adjacent the latter, the slider being adapted to swing toward the latch plate;
a catch member attached to the latch plate and extending longitudinally thereof, said slider being provided with a latch adapted to engage the catch member, when the slider is moved toward the latch plate, to lock the slider in its position;
an elongated trip plate pivoted on said base to rotate about an axis parallel to and in the same plane as the pivots of the latch plate, the trip plate being spaced from said end of the slider; and
means movable along the surface of the trip plate nearest said end of the slider and adapted to be brought into interposition between said end and said trip plate to cause rotation of the latter.

15. The apparatus of claim 14 in which said the last named means is an endless belt driven by said motor, and having attached thereto a protuberance thicker than the distance between said end of said slider and said trip plate, whereby said protuberance, in passing between said end and the trip plate, rotates the trip plate about its axis.

16. The apparatus of claim 14 in which said latch plate, in rotating about its axis, is adapted to actuate said switch into motor-running position.

17. The apparatus of claim 13 in which said adjustably positionable manually actuable means comprises:
an elongated latch plate pivoted on said base to rotate about an axis running the length of the plate;
a plurality of sliders mounted on the base on longitudinal guide means adjacent the latch plate and each adapted individually to be moved longitudinally on the guide means, each slider extending transversely toward the latch plate and having an end adjacent the latter, each slider being adapted to swing toward the latch plate;
a catch member attached to the latch plate and extending longitudinally thereof, each of said sliders being provided with a latch adapted to engage the catch member, when the slider is moved toward the latch plate, to lock said slider in its position, the latch on each one of said sliders cooperating with said catch member to release the latch engagement therewith of any others of said sliders when said one slider is moved into locking position.

18. Apparatus for dispensing a length of tape from a source thereof including:
a base;
a pair of rolls extending transversely of the base and meeting at their surfaces for engaging tape therebetween, one of said rolls being mounted on a first shaft;
a motor;
an input drive shaft operated by said motor and in axial alignment with said first shaft;
a first clutch drum mounted on said input drive shaft and rotatable therewith;
a second clutch drum mounted on said first shaft and adapted to rotate said first shaft, said second drum being axially adjacent one end of said first drum;
a first helical spring having its turns wound around said first and second drums and adapted to link rotationally said first and second drums when its turns are in one condition but not when its turns are in another condition;

first means for changing the condition of the turns of said first spring;

a third clutch drum mounted on said input drive shaft adjacent the other end of said first drum and rotatable with respect to said input drive shaft;

a second helical spring havings its turns wound around said first and third drums and adapted to link rotationally said first and third drums when its turns are in one condition but not when its turns are in another condition;

second means for changing the condition of the turns of said second spring;

a cam mounted on said input drive shaft and fastened to the end of said third drum to rotate therewith;

a second shaft rotatably mounted on the base;

a knife attached to said second shaft for cutting tape, said knife being reciprocated upon turning of said second shaft;

a cam follower mounted on said second shaft and engaging said cam for rotating said second shaft when said cam rotates;

manually actuable mean adjustably positionable on said base for determining the length of tape to be ejected from the apparatus and severed, said manually actuable means also being adapted when actuated to start said motor;

third means on said base adapted to activate said first means to cause a change in condition of the turns of said first helical spring whereby said second drum is rotated; and fourth means on said base adapted to cause a change in condition of the turns of said first helical spring to stop the rotation of said second drum, said fourth means also being adapted to cause a change in condition of the turns of said second helical spring whereby said third drum begins to rotate when said second drum stops rotating.

19. The apparatus of claim 18 in which said manually actuable means comprises:

an elongated latch plate pivoted on said base to rotate about and axis running the length of the plate;

a slider mounted on the base on longitudinal guide means adjacent the latch plate, and the slider being adapted to be moved longitudinally on the guide means, the slider extending toward the latch plate and having an end adjacent the latter, the slider being adapted to swing toward the latch plate;

a catch member attached to the latch plate and extending longitudinally thereof, the slider being provided with a latch adapted to engage said catch, when the slider is moved toward the latch plate, to lock the slider in its position;

an elongated trip plate pivoted on said base to rotate about an axis parallel to and in the same plane as the pivots of the latch plate, the trip plate being spaced from said end of the slider; and means movable along the surface of the trip plate and adapted to be brought into interposition between said end and said trip plate to cause rotation of the latter to actuate said fourth means.

20. The apparatus of claim 18 in which said manually actuable means comprises:

an elongated latch plate pivoted on said base to rotate about an axis running the length of the plate;

a plurality of sliders mounted on the base on longitudinal guide means adjacent the latch plate, each slider being adapted individually to be moved longitudinally on the guide means, each slider extending toward the latch plate and having an end projecting adjacent the latter, and each slider being adapted to swing toward the latch plate;

a catch member attached to the latch plate and extending longitudinally thereof, each of said sliders being provided with a latch adapted to engage the catch member, when the slider is moved toward the latch plate, to lock said slider in its position, the latch on each one of said sliders cooperating with the catch member to release the latch engagement therewith of any others of said sliders when said one slider is moved into locking position.

21. The apparatus of claim 19 in which said manually actuable means includes an endless belt driven by said motor, said belt having attached thereto a protuberance thicker than the distance between said end of said slider and said trip plate, whereby said protuberance, in passing between said end and the trip plate, rotates the trip plate about its axis to actuate said fourth means.

22. The apparatus of claim 19 in which said latch plate, in rotating about its axis, is adapted to start said motor.

23. The apparatus of claim 21 including means adapted to be actuated by said protuberance to activate said third means to cause said second drum to rotate.

24. The apparatus of claim 21 including means adapted to be actuated by said protuberance to stop said motor after said fourth means has been actuated.

25. In a tape dispensing apparatus having a base, a supply of tape on said base, a feed mechanism, a cutting knife for severing a length of tape from the supply thereof, and driving means for energizing the feed mechanism and the cutting knife, a control mechanism for said driving means comprising in combination:

a first elongated means rotatably mounted on the base said first elongated member, on being rotated, starting said driving means;

at least one selector member movably mounted on said base and adapted to engage said elongated means both to rotate the latter and to engage latching means carried by the latter;

a second elongated means rotatably mounted on the base, said second elongated means, on being rotated, deenergizing the feed mechanism and operatively connecting the cutting knife to the driving means;

a third means rotatably mounted on the base, said third means, on being rotated, operatively energizing the feed mechanism;

a fourth means rotatably mounted on the base, said fourth means, on being rotated, stopping the driving means; and a fifth means movably mounted on the base and, in cooperating with said selector member, adapted to cause rotation of said third, second and fourth means in sequence, the interval between the rotations of said second and third means being determined by the position of said selector member with respect to said second means.

26. The apparatus of claim 25 in which:

said first, elongated means is a first plate attached to the base by means of pivots, one at each end;

said selector member is slide member movably mounted on the base and movable lengthwise of said first plate;

said latching means is a hook-shaped projection extending the length of said plate to be engageable by a cooperating latch on said slide member at any position of the latter lengthwise of the plate;

said second elongated means is a second plate attached to the base by means of pivots, one at each end;

said third means comprises a pivoted arm adapted on rotation to lift a pawl for energizing a clutch operatively connecting said driving means and said feed mechanism;

said fourth means comprises a pivoted arm adapted on rotation to stop said driving means; and said fifth means comprises an endless belt carrying a protuberance thereon, said belt being positioned with respect to said selector member and said second, third and fourth means so that on motion of the belt said protuberance moves said third, second and fourth means.

27. The apparatus of claim 1 in which said first and second means comprise a clutch mechanism and control means therefor comprising:
an input shaft adapted to be rotated by said motor;
a first drum mounted on the shaft and rotatable therewith, the drum having first and second ends;
a second drum mounted on the shaft adjacent said first end and rotatable with respect to the shaft;
a first helical spring having first turns wound around a portion of the first drum and having second turns wound around the second drum, said spring, upon tightening of the first turns, driving the second drum from the first drum;
a ratchet wheel rotatably mounted on the first drum and engaging the free end of said first turns, the ratchet wheel, when prevented from turning with the first drum, restraining said end to loosen said first turns from the first drum;
a third drum mounted on the shaft adjacent said second end and rotatable with respect to the shaft;
a second helical spring having third turns wound around a portion of the first drum and having fourth turns wound around the third drum, said spring, upon tightening of its turns, driving the third drum from the first drum, the free end of said first turns projecting radially outward;
a pawl adapted to engage and disengage said ratchet wheel;
a detent adapted to catch and to release said free end of the second spring; and
actuating means for the pawl and the detent, the actuating means being movable first to release the pawl from the ratchet wheel to cause rotation of the second drum, and secondly to reengage the pawl to stop said drum from rotating while substantially simultaneously releasing the detent from said free end of the second spring to cause rotation of the third drum.

References Cited

UNITED STATES PATENTS 1,647,305   11/1927   Peters _____ 83—204
3,176,563   4/1965    Sharpe _____ 83—241

JAMES M. MEISTER, Primary Examiner

U.S. Cl. X.R.

83—241, 283